United States Patent
Matsuhara et al.

(10) Patent No.: US 9,888,137 B2
(45) Date of Patent: Feb. 6, 2018

(54) SYSTEM FOR DISPLAYING SCREEN(S) ON A REMOTE TERMINAL WHILE USING MULTIPLE PERIPHERAL DEVICES

(71) Applicant: KONICA MINOLTA, INC., Tokyo (JP)

(72) Inventors: Kenji Matsuhara, Kawanishi (JP); Takeshi Minami, Amagasaki (JP); Kenichi Takahashi, Osaka (JP); Kaitaku Ozawa, Nishinomiya (JP); Yoshiaki Shibuta, Itami (JP); Yosuke Taniguchi, Osaka (JP); Atsushi Tamura, Amagasaki (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/740,734

(22) Filed: Jun. 16, 2015

(65) Prior Publication Data
US 2015/0365552 A1 Dec. 17, 2015

(30) Foreign Application Priority Data

Jun. 17, 2014 (JP) ................................ 2014-124520

(51) Int. Cl.
*G06F 3/12* (2006.01)
*H04N 1/00* (2006.01)
*H04N 1/32* (2006.01)

(52) U.S. Cl.
CPC ..... *H04N 1/00307* (2013.01); *H04N 1/00503* (2013.01); *H04N 1/32518* (2013.01);
(Continued)

(58) Field of Classification Search
CPC ........... H04N 1/00307; H04N 1/00503; H04N 1/32518; H04N 1/32534; H04N 1/32539
(Continued)

(56) References Cited

U.S. PATENT DOCUMENTS

2012/0069380 A1* 3/2012 Sugimoto ............. G06F 3/1205
                                                                 358/1.14
2012/0075485 A1* 3/2012 Mizutani ............. H04M 1/7253
                                                                 348/207.1
(Continued)

FOREIGN PATENT DOCUMENTS

CN 102348029 A 2/2012
CN 102694938 A 9/2012
(Continued)

OTHER PUBLICATIONS

Office action from corresponding European patent application No. 15170980.5, dated Mar. 3, 2016, 7 pgs, mailed from European Patent Office, Munich, Germany.

*Primary Examiner* — Neil R McLean
(74) *Attorney, Agent, or Firm* — Baker & Hostetler LLP

(57) ABSTRACT

A processing apparatus having a function to perform specific processing based on a request from a terminal is provided. The processing apparatus includes a connection portion configured to connect the processing apparatus to the terminal; and a processor configured to control the terminal to display a second screen including a part or a whole of a first screen, the first screen having been displayed in the terminal by another processing apparatus with the function before the processing apparatus connects to the terminal.

14 Claims, 19 Drawing Sheets

(52) U.S. Cl.
CPC ..... *H04N 1/32534* (2013.01); *H04N 1/32539* (2013.01); *H04N 2201/006* (2013.01); *H04N 2201/0041* (2013.01); *H04N 2201/0055* (2013.01); *H04N 2201/0075* (2013.01); *H04N 2201/0094* (2013.01); *H04N 2201/0096* (2013.01)

(58) Field of Classification Search
USPC ........................................................ 358/1.15
See application file for complete search history.

(56) References Cited

U.S. PATENT DOCUMENTS

2012/0243017 A1* 9/2012 Machida ............ H04N 1/00503
358/1.13
2014/0155121 A1   6/2014 Haba

FOREIGN PATENT DOCUMENTS

| CN | 103856667 A   | 6/2014  |
|----|---------------|---------|
| JP | 2012-203152 A | 10/2012 |
| JP | 2013-223137 A | 10/2013 |
| JP | 2014-103562 A | 6/2014  |

* cited by examiner

| THE OTHER END OF CONNECTION | CONNECTED TIME |
|---|---|
| MFP_A | 13:10:00 |
| MFP_B | 13:12:37 |
| MFP_C | 13:16:30 |

| MFP NAME | THE OTHER END OF CONNECTION |
|---|---|
| MFP_A | |
| MFP_B | |
| MFP_C | |
| | |

54

(B)

| MFP NAME | THE OTHER END OF CONNECTION |
|---|---|
| MFP_A | TERMINAL_A |
| MFP_B | |
| MFP_C | |
| | |

54

(C)

| MFP NAME | THE OTHER END OF CONNECTION |
|---|---|
| MFP_A | |
| MFP_B | TERMINAL_A |
| MFP_C | |
| | |

54

(D)

| MFP NAME | THE OTHER END OF CONNECTION |
|---|---|
| MFP_A | |
| MFP_B | |
| MFP_C | TERMINAL_A |
| | |

FIG. 10A

CHOOSE A BOX FOR DOCUMENT TO BE USED/FILED.

| SHARED | PERSONAL | SYSTEM | GROUP | DOCUMENT SAVING |

MFP_A BOX_101   MFP_A BOX_102   MFP_A BOX_103

1/1

BOX SEARCH

SPECIFY BOX NUMBER

USE/FILE

2009/09/25  12:34
AVAILABLE MEMORY  99%

LANGUAGE SELECTION

DISPLAY JOBS
SETTING DETAILS
REGISTRATION SOURCE | STATUS
DELETE
JOB DETAILS
Y☐ M☐ C☐ K☐

6B1 (61)

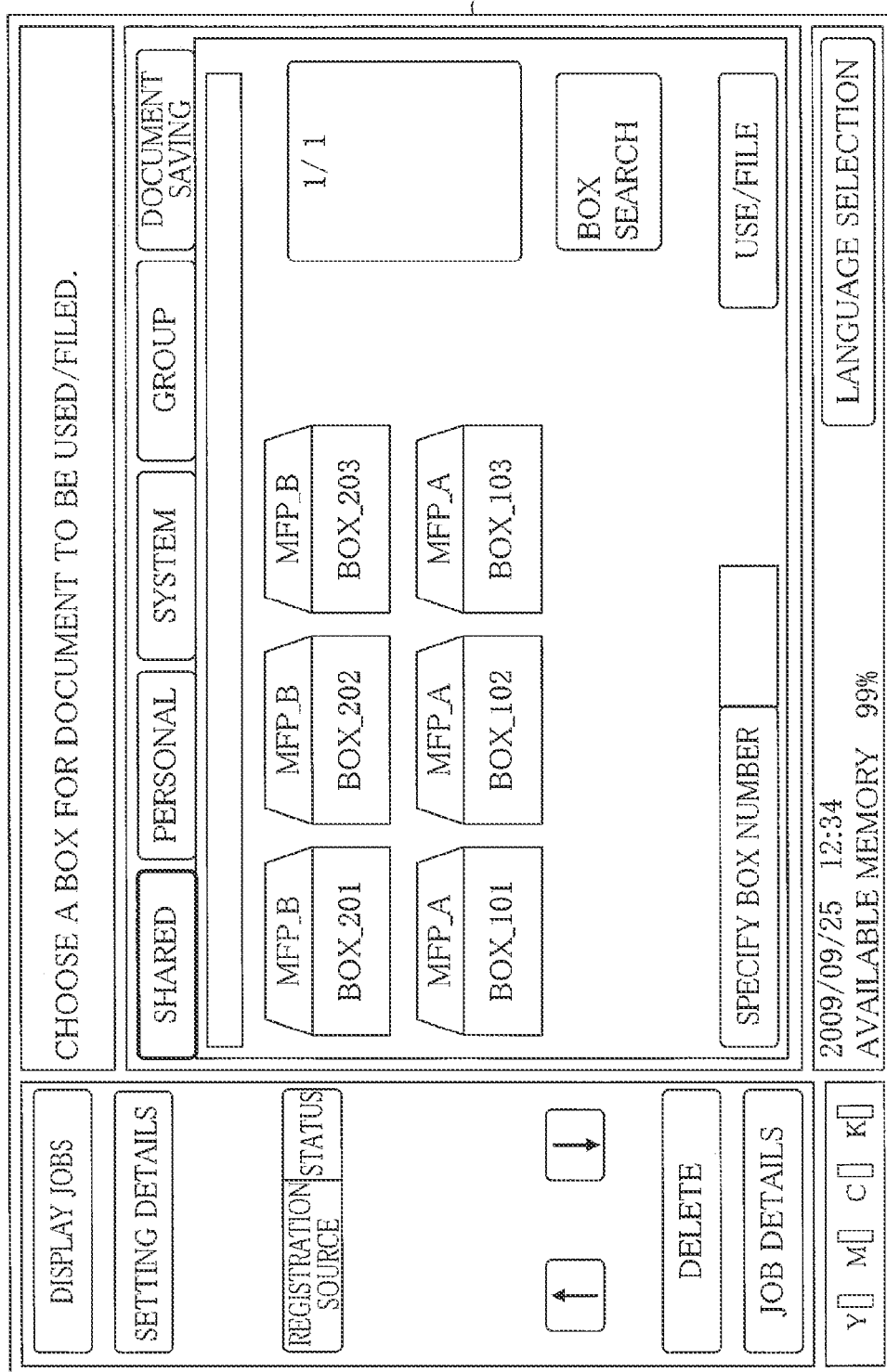

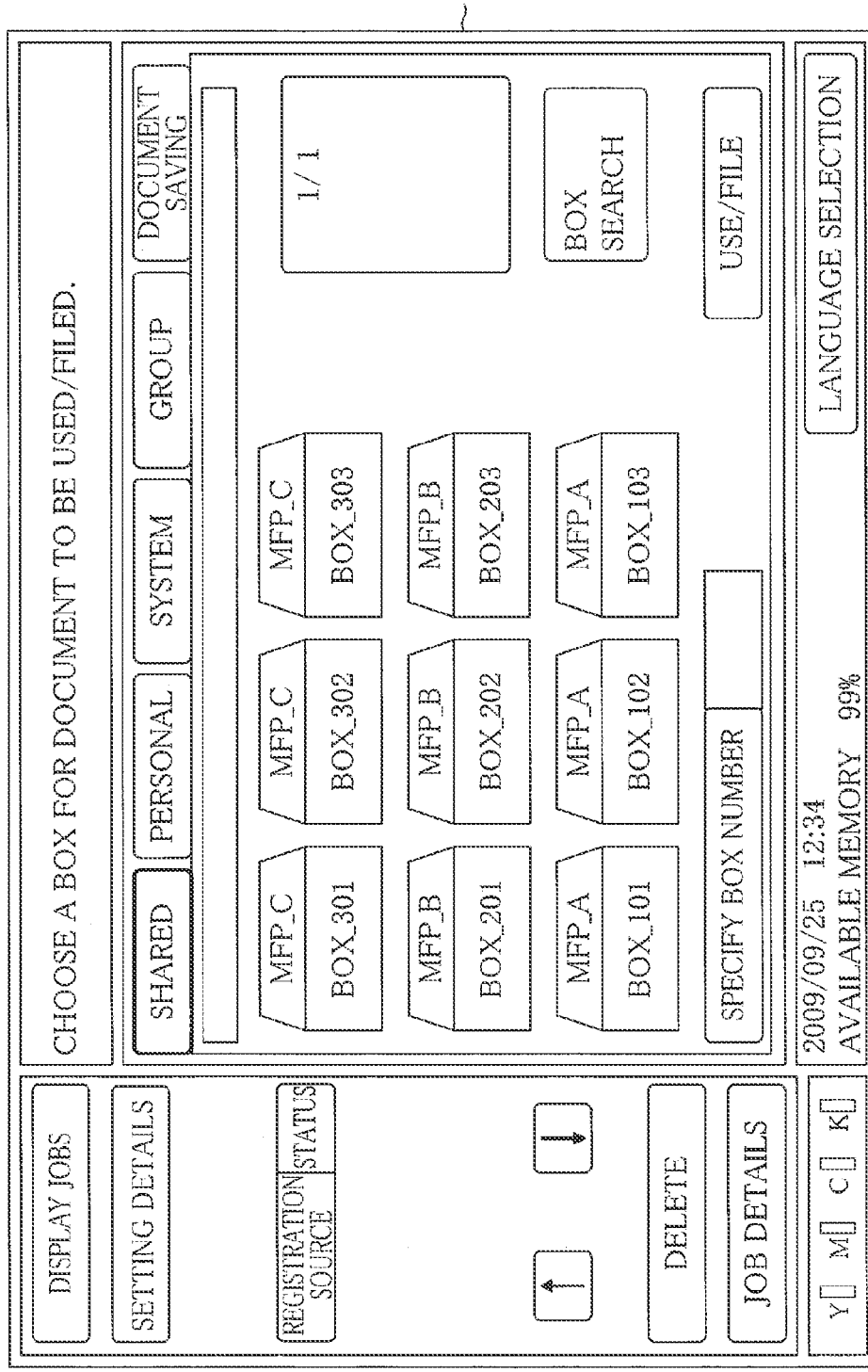

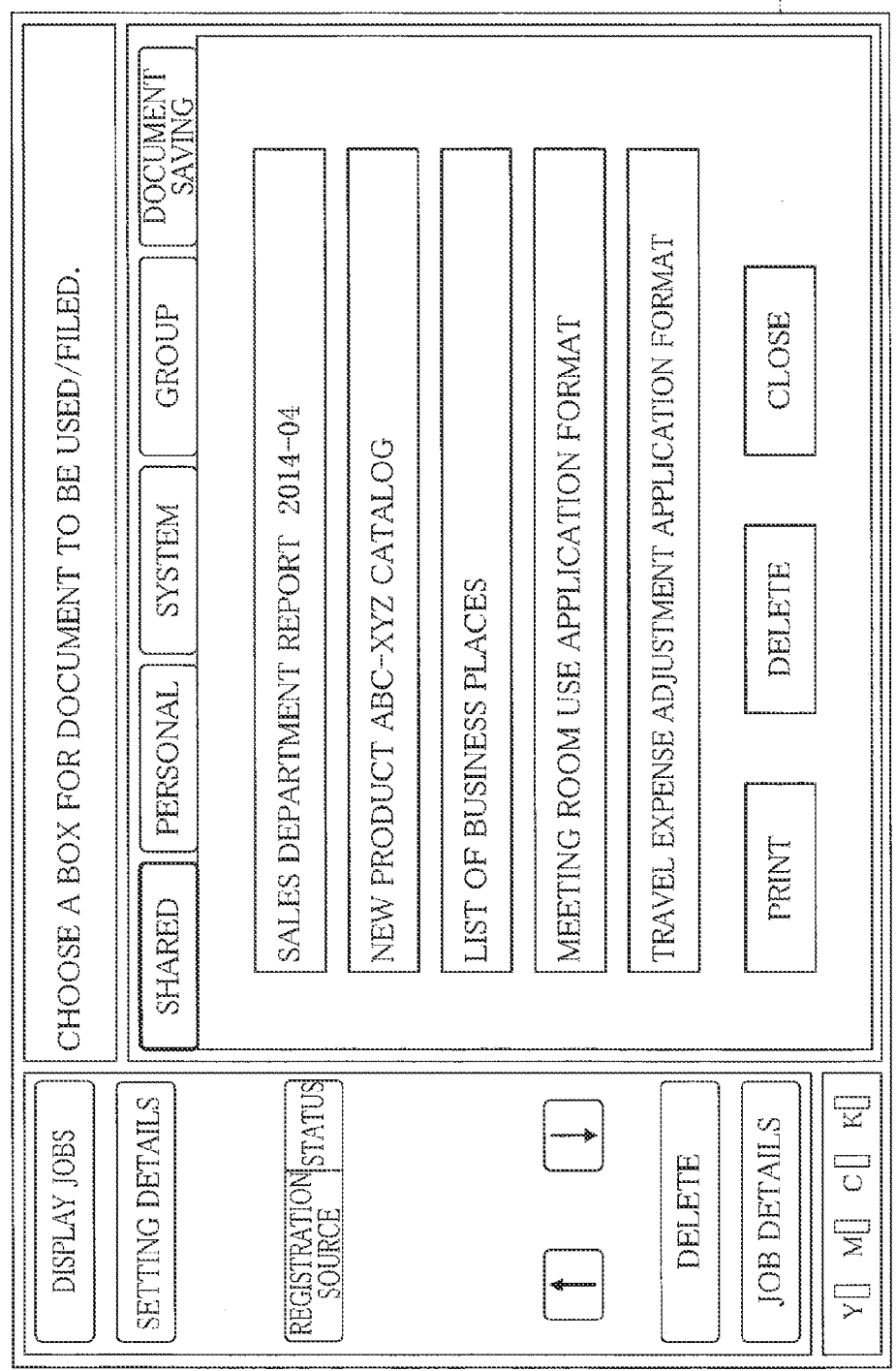

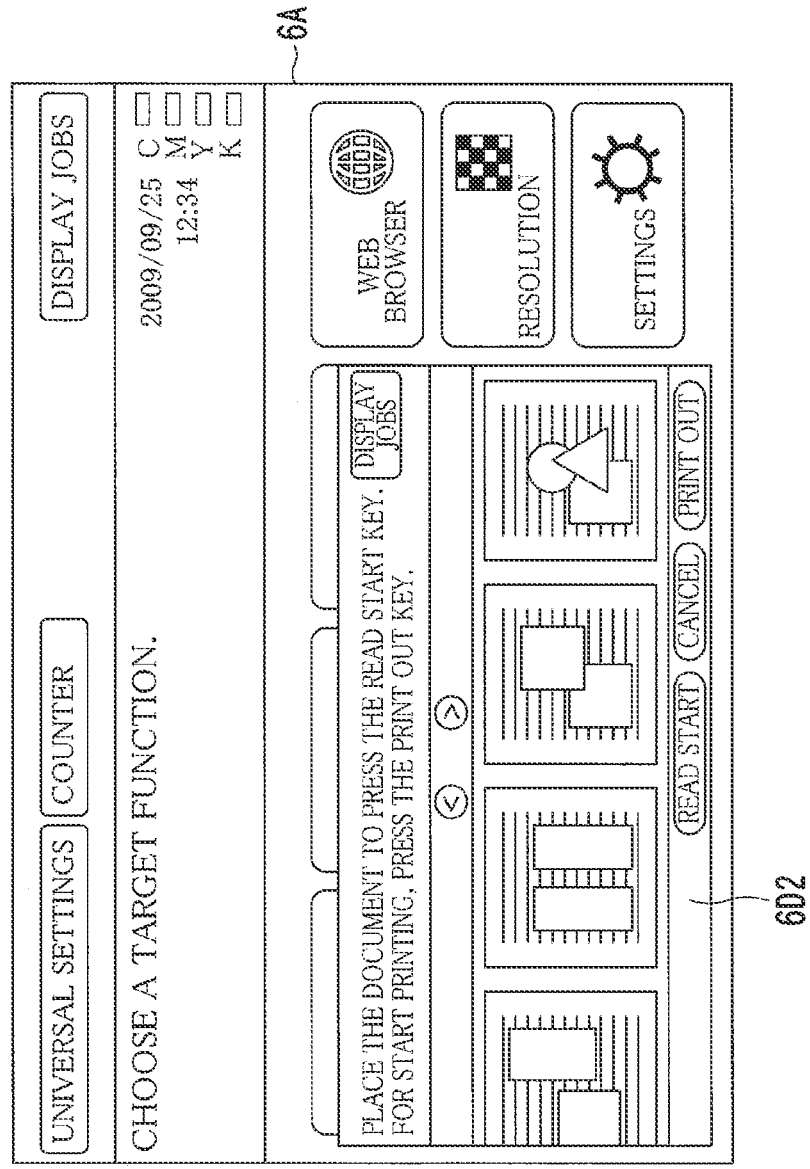

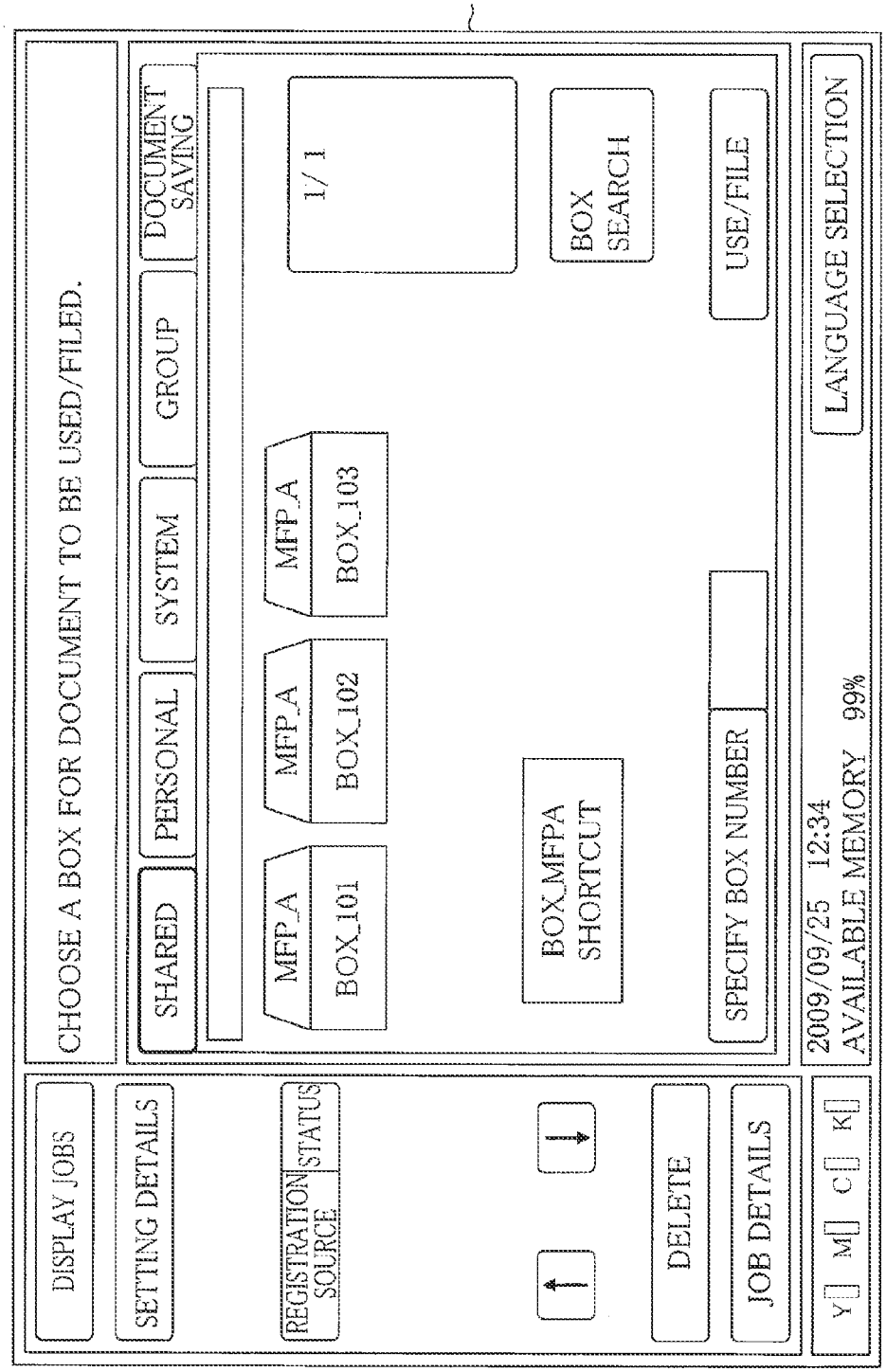

SYSTEM FOR DISPLAYING SCREEN(S) ON A REMOTE TERMINAL WHILE USING MULTIPLE PERIPHERAL DEVICES

This application is based on Japanese patent application No. 2014-124520 filed on Jun. 17, 2014, the contents of which are hereby incorporated by reference.

BACKGROUND OF THE INVENTION

1. Field of the Invention

The present invention relates to a processing apparatus such as an image forming apparatus, a display method used in a terminal connected to the processing apparatus, and so on.

2. Description of the Related Art

Image forming apparatuses have attained widespread use which have a variety of functions such as copying, scanning, faxing, document managing, and image editing. Such image forming apparatuses are sometimes called "multifunction devices" or "Multi-Functional Peripherals (MFPs)".

Such an image forming apparatus is usually provided with a touch-sensitive panel display. A wide variety of screens is displayed on the touch-sensitive panel display. The screens are used to operate the image forming apparatus. Technologies have been proposed with which such a screen is displayed in a portable terminal, e.g., a tablet computer and a smartphone, and the image forming apparatus performs processing in accordance with remote operation from the portable terminal.

One of the technologies is as follows. Control is made in such a manner that, if a distance between an information processing apparatus (image forming apparatus) and a mobile terminal (terminal) is smaller than a predetermined distance, then the mobile terminal enters into a cooperative panel mode which allows the mobile terminal to display a part which cannot be displayed in a display portion of the information processing apparatus. Further, control is made in such a manner that, if the distance between the information processing apparatus and the mobile terminal is equal to or greater than the predetermined distance, then the mobile terminal enters into a remote panel mode which allows the mobile terminal by itself to operate the information processing apparatus (Japanese Laid-open Patent Publication No. 2013-223137).

Another one of the technologies is as follows. A control device includes: a retrieval request receiving part for receiving a request to retrieve an operation screen that is registered in one of other image forming devices which are connected with an image forming device; a retrieval part for retrieving the operation screen matching with a retrieval condition; a display control part for displaying the retrieved operation screen on a display device provided for the image forming device; a receiving part for receiving an instruction to the one of the other image forming devices from a user via the operation screen of the one of the other image forming devices which is displayed on the display device; and a transmission part for transmitting the instruction, which is received from the user via the operation screen of the one of the other image forming devices, to the one of the other image forming devices (English Abstract of Japanese Laid-open Patent Publication No. 2012-203152).

One facility sometimes has a plurality of image forming apparatuses. In recent years, the image forming apparatuses and users thereof have been centrally managed by a server. This enables a user to use an image forming apparatus located close to him/her.

Further, terminals such as tablet computers and smartphones have come into widespread use. A user carries around such a terminal and use the terminal in various places of the facility.

SUMMARY

The present invention has been achieved in light of such a change in facility environment, and an object thereof is to perform remote operation by means of a terminal more easily than is conventionally possible in an environment where a plurality of processing apparatuses such as image forming apparatuses is installed.

A processing apparatus according to an aspect of the present invention is a processing apparatus having a function to perform specific processing based on a request from a terminal. The processing apparatus includes a connection portion configured to connect the processing apparatus to the terminal; and a processor configured to control the terminal to display a second screen including a part or a whole of a first screen, the first screen having been displayed in the terminal by another processing apparatus with the function before the processing apparatus connects to the terminal.

These and other characteristics and objects of the present invention will become more apparent by the following descriptions of preferred embodiments with reference to drawings.

BRIEF DESCRIPTION OF THE DRAWINGS

FIG. 6 is a diagram showing an example of connection historical data.

FIG. 8 is a diagram showing an example of a connection information table and transition thereof.

FIGS. 10A-10C are diagrams showing examples of a box management screen.

FIG. 11 is a diagram showing an example of a file list screen.

FIGS. 12A and 12B are diagrams showing examples of a preview screen.

FIGS. 15A and 15B are diagrams showing modified examples of a box management screen.

DESCRIPTION OF THE PREFERRED EMBODIMENTS

Figure 1:
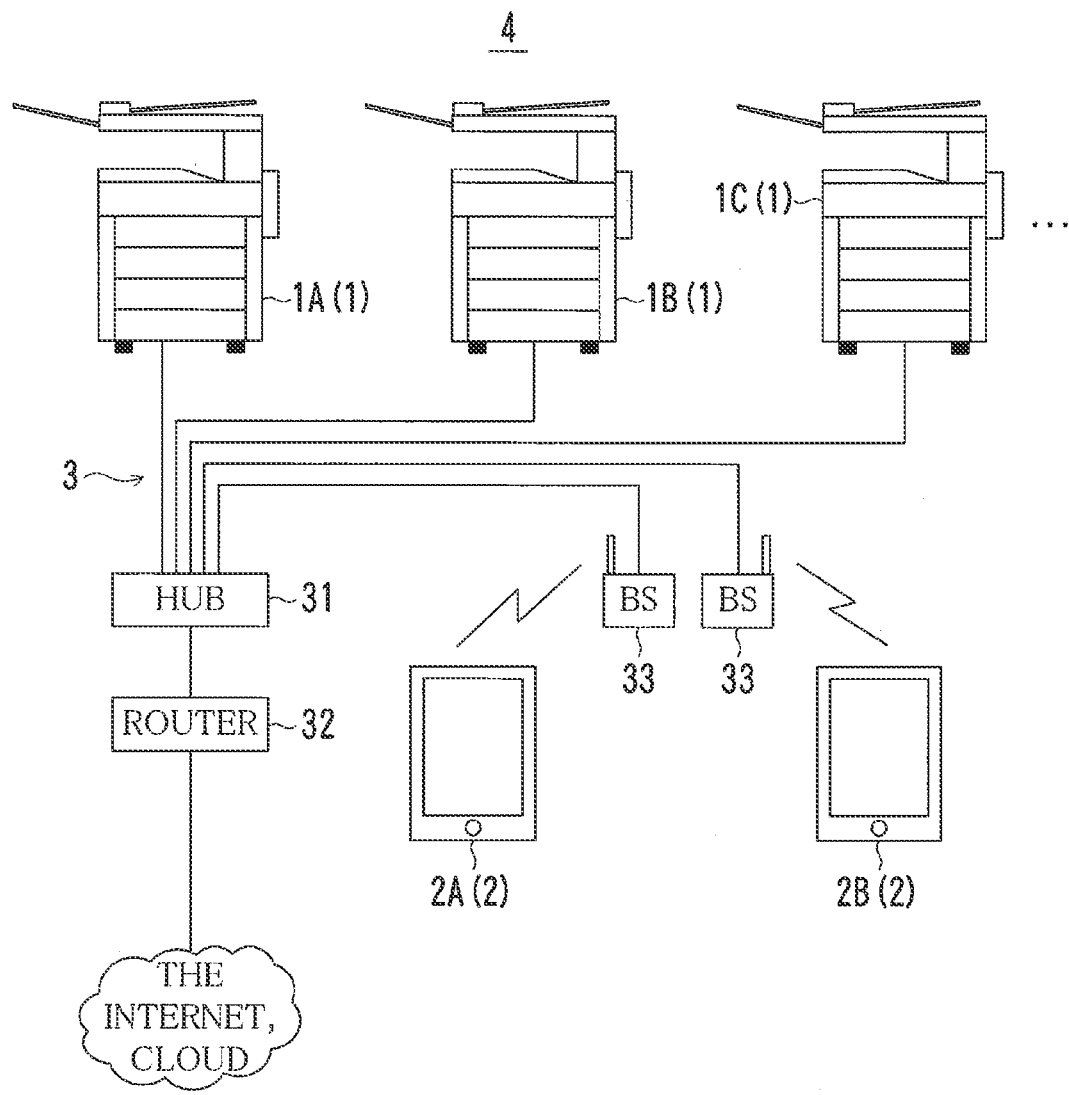
FIG. 1 is a diagram showing an example of the overall configuration of a LAN.
Figure 2:
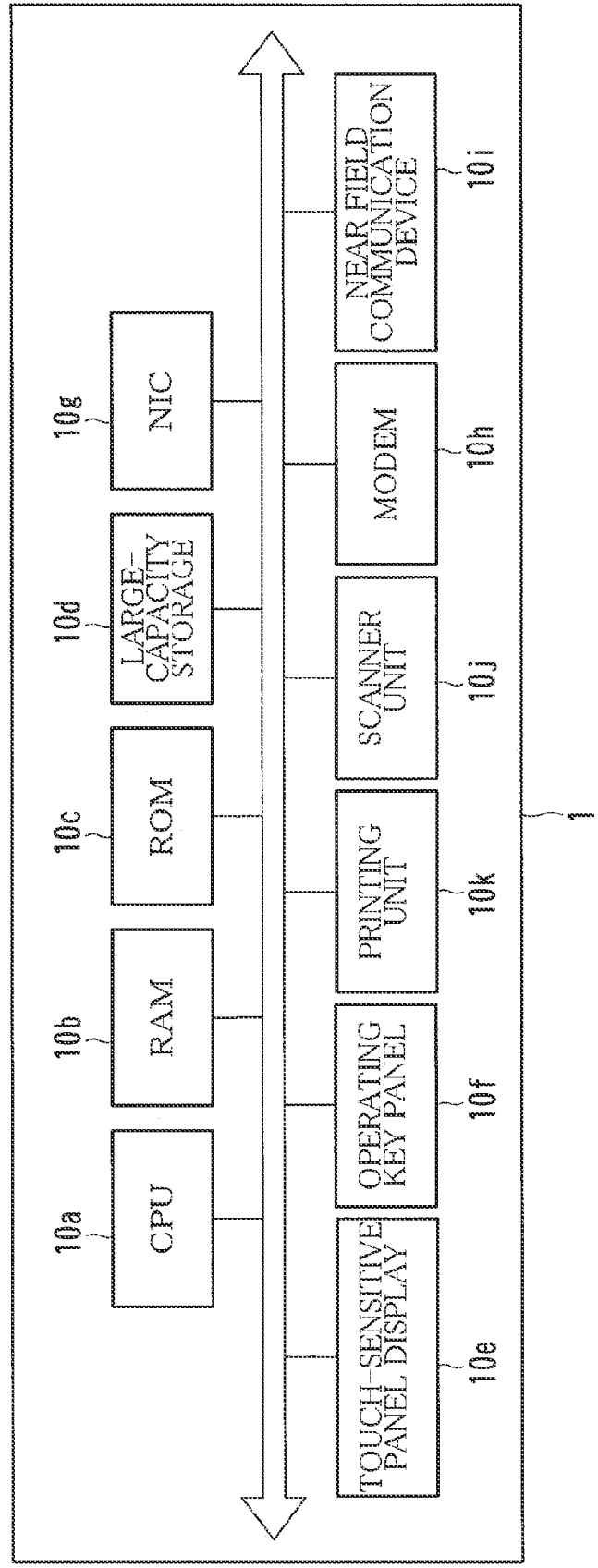
FIG. 2 is a diagram showing an example of the hardware configuration of an image forming apparatus.
Figure 3:
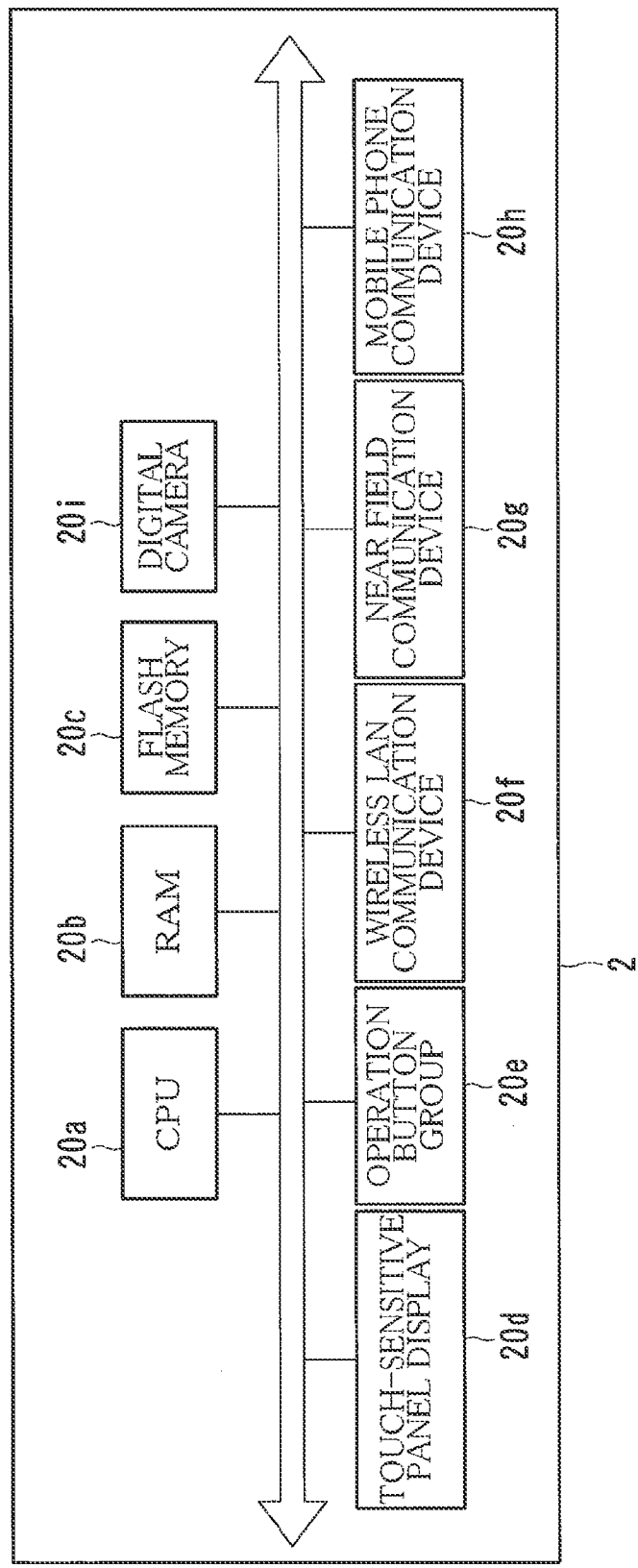
FIG. 3 is a diagram showing an example of the hardware configuration of a terminal.

FIG. 1 is a diagram showing an example of the overall configuration of a Local Area Network (LAN) 4. FIG. 2 is a diagram showing an example of the hardware configuration of an image forming apparatus 1. FIG. 3 is a diagram showing an example of the hardware configuration of a terminal 2.

As shown in FIG. 1, the LAN 4 is configured of a plurality of the image forming apparatuses 1, a plurality of the terminals 2, a communication line 3, and so on.

Hereinafter, the image forming apparatuses 1 may be described separately as an "image forming apparatus 1A", an "image forming apparatus 1B", an "image forming apparatus 1C" . . . , and so on. Likewise, the terminals 2 may be described separately as a "terminal 2A", a "terminal 2B", . . . , and so on.

The image forming apparatus 1 is an apparatus into which functions such as copying, PC printing, faxing, scanning, and box function are combined. The image forming apparatus 1 is generally called a "multifunction device" or a "Multi-Functional Peripheral (MFP)".

The PC printing function is to print an image onto paper based on image data sent by the terminal 2. The PC printing function is sometimes called "network printing" or "network print".

The box function is a function in which a storage area called a "box" or "personal box" is allocated to each user. The box function enables each user to save image data and the like to his/her storage area and to manage the same therein. The box may be provided for each group and shared by members of the group. The box corresponds to a "folder" or "directory" in a personal computer.

Referring to FIG. 2, the image forming apparatus 1 is configured of a Central Processing Unit (CPU) 10a, a Random Access Memory (RAM) 10b, a Read Only Memory (ROM) 10c, a large-capacity storage 10d, a touch-sensitive panel display 10e, an operating key panel 10f, a Network Interface Card (NIC) 10g, a modem 10h, a near field communication device 10i, a scanner unit 10j, a printing unit 10k, and so on.

The touch-sensitive panel display 10e displays, for example, a screen for presenting messages to a user, a screen for allowing the user to input commands or information, a screen for showing the results of processing executed by the CPU 10a, and so on. The touch-sensitive panel display 10e sends a signal indicating a touched location to the CPU 10a.

The operating key panel 10f is a so-called hardware keyboard, and is provided with a numeric keypad, a start key, a stop key, and a function key.

The NIC 10g performs communication with other devices in accordance with a protocol such as Transmission Control Protocol/Internet Protocol (TCP/IP).

The modem 10h sends and receives image data with a facsimile terminal in accordance with a protocol such as G3.

The near field communication device 10i performs communication based on the standard for near field communication. In this embodiment, an example of the near field communication device 10i is a Bluetooth (registered trademark)-ready device.

The scanner unit 10j optically reads an image recorded on a sheet placed on a platen glass to generate image data thereof.

The printing unit 10k prints, onto paper, the image captured by the scanner unit 10j and an image received from other devices by the NIC 10g, the modem 10h, or the near field communication device 10i.

The ROM 10c or the large-capacity storage 10d stores, therein, programs for implementing the foregoing functions including the copying function. The ROM 10c or the large-capacity storage 10d also stores, therein, a remote service program 10P which enables the image forming apparatus 1 to provide a remote panel service to the terminal 2. The remote panel service is to enable a touch-sensitive panel display of the terminal 2 to display the same screen as that displayed in the touch-sensitive panel display 10e, and to enable a user to operate the image forming apparatus 1 from a remote location via the terminal 2.

The programs are loaded into the RAM 10b as necessary and executed by the CPU 10a. Examples of the large-capacity storage 10d are a hard disk drive or a Solid State Drive (SSD).

Referring back to FIG. 1, the terminal 2 is a client of the image forming apparatus 1. The user may use the foregoing functions of the image forming apparatus 1 from a remote location. As described above, the user may use the touch-sensitive panel display of the terminal 2 in place of the touch-sensitive panel display 10e.

Examples of the terminal 2 include a laptop computer, a smartphone, and a tablet computer. The following description takes an example in which the terminal 2 is a tablet computer.

Referring to FIG. 3, the terminal 2 is configured of a CPU 20a, a RAM 20b, a flash memory 20c, a touch-sensitive panel display 20d, an operation button group 20e, a wireless LAN communication device 20f, a near field communication device 20g, a mobile phone communication device 20h, a digital camera 20i, and so on.

As with the touch-sensitive panel display 10e of the image forming apparatus 1, the touch-sensitive panel display 20d displays a variety of screens, and detects a touched location to inform the CPU 20a of the touched location.

The operation button group 20e includes a button for returning to a start screen, a button for controlling sound volume, and a button for switching between ON and OFF of the power supply.

The wireless LAN communication device 20f performs communication based on the standard for wireless LAN, specifically, the standard for Institute of Electrical and Electronics Engineers (IEEE) 802.11.

The near field communication device 20g performs communication based on the same standard as that used in the near field communication device 10i of the image forming apparatus 1. In this embodiment, therefore, the near field communication device 20g performs communication based on the standard for Bluetooth.

The mobile phone communication device 20h performs communication through a mobile phone network based on the standard for Code Division Multiple Access (CDMA) 2000, Wideband-CDMA (W-CDMA), or Long Term Evolution (LTE).

The digital camera 20i captures an image to generate image data thereof. The digital camera 20i is also capable of recording a moving image to generate image data of the moving image.

The flash memory 20c stores therein application programs for a document preparation application (word processing software, for example), a mailer, a web browser, and a scheduler. The flash memory 20c also stores a remote client program 20P therein. The remote client program 20P is a program which enables the terminal 2 to receive the remote panel service.

The programs are loaded into the RAM 20b as necessary and executed by the CPU 20a.

Referring back to FIG. 1, the communication line 3 is a so-called LAN, and is configured of a hub 31, a router 32, a wireless base station 33, and so on.

The router 32 serves to connect the LAN 4 to another network such as the Internet. The wireless base station 33 is a Base Station (BS) for wireless LAN. The wireless base station 33 performs communication with the wireless LAN communication device 20f of the terminal 2.

The wireless base station 33 and each of the image forming apparatuses 1 are connected to the hub 31 via a twisted pair cable. The hub 31 is connected via the twisted pair cable to the router 32. The communication line 3 may include a plurality of the hubs 31 and a plurality of the wireless base stations 33.

The communication line 3 enables data to be sent/received between the image forming apparatuses 1, the terminals 2, and devices of another network (e.g., a so-called cloud computer).

Figure 4:
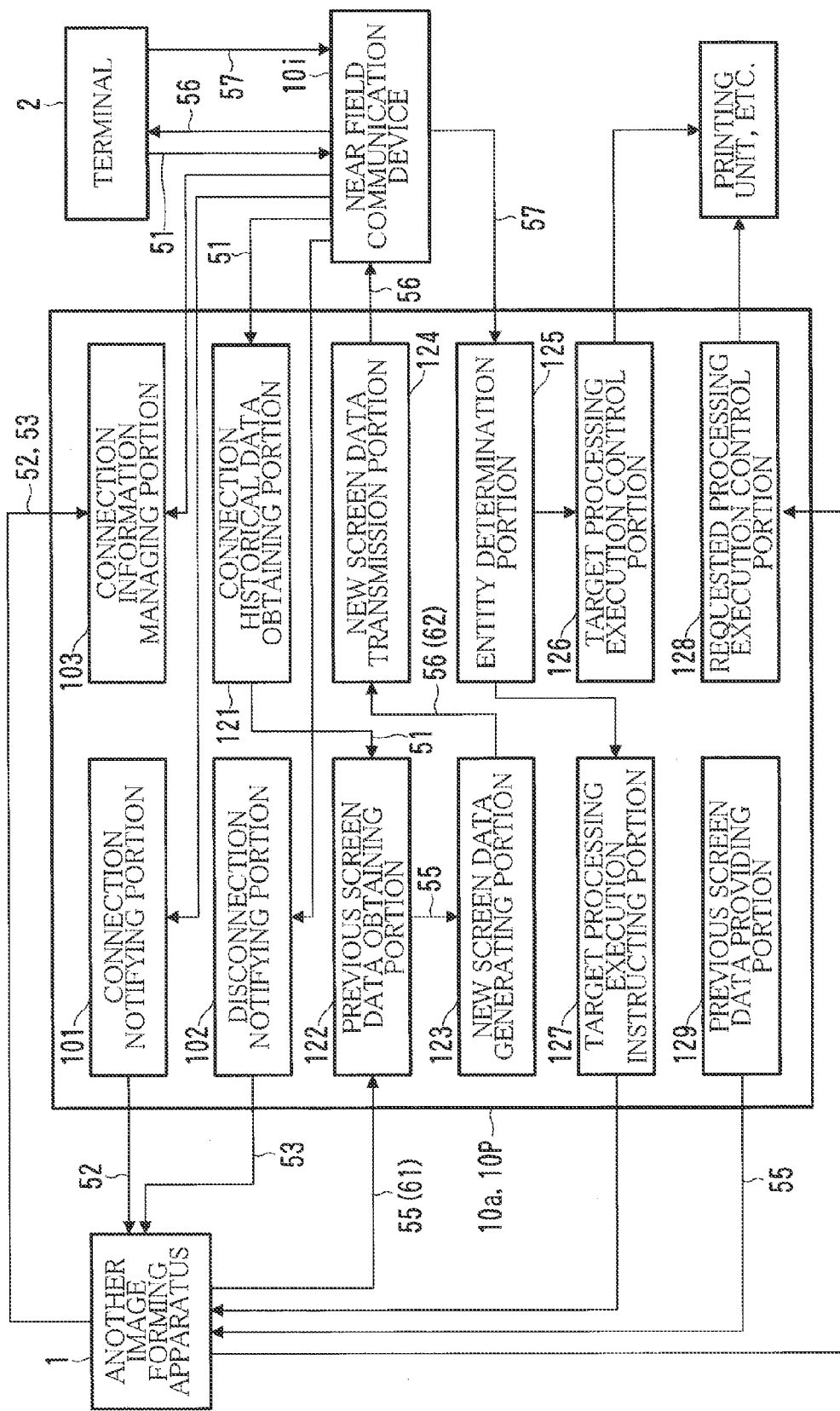
FIG. 4 is a diagram showing an example of the functional configuration of an image forming apparatus.
Figure 5:
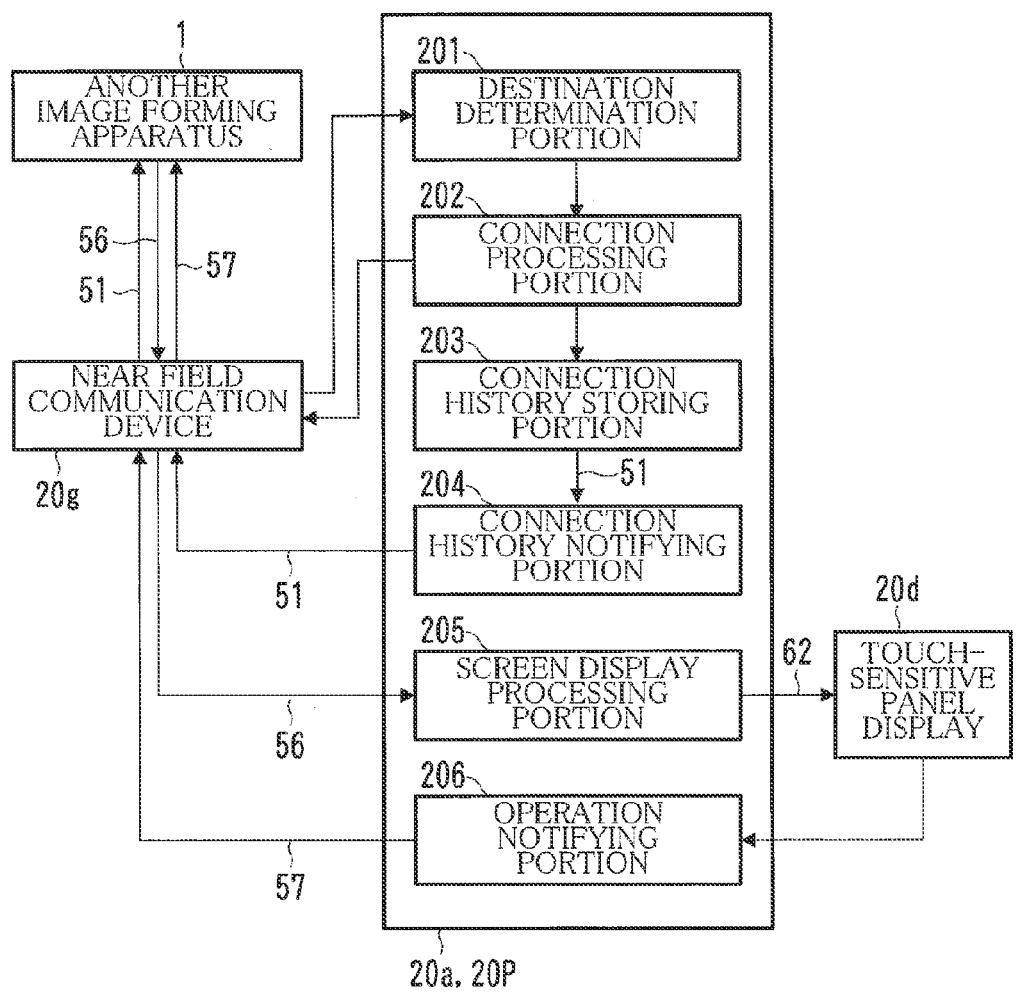
FIG. 5 is a diagram showing an example of the functional configuration of a terminal.

FIG. 4 is a diagram showing an example of the functional configuration of the image forming apparatus 1. FIG. 5 is a diagram showing an example of the functional configuration of the terminal 2.

The description goes on to functions implemented in the image forming apparatus 1 by the remote service program 10P, and functions implemented in the terminal 2 by the remote client program 20P with reference to FIGS. 4, 5, and so on.

The remote service program 10P implements the functions of a connection notifying portion 101, a disconnection notifying portion 102, a connection information managing portion 103, a connection historical data obtaining portion 121, a previous screen data obtaining portion 122, a new screen data generating portion 123, a new screen data transmission portion 124, an entity determination portion 125, a target processing execution control portion 126, a target processing execution instructing portion 127, a requested processing execution control portion 128, a previous screen data providing portion 129, and so on, all of which are shown in FIG. 4.

The remote client program 20P implements the functions of a destination determination portion 201, a connection processing portion 202, a connection history storing portion 203, a connection history notifying portion 204, a screen display processing portion 205, an operation notifying portion 206, and so on, all of which are shown in FIG. 5.

[Processing Related to Connection and Disconnection]

FIG. 6 shows an example of connection historical data 51.

The image forming apparatus 1 and the terminal 2 are connected to each other with Bluetooth. Hereinafter, the individual portions of the terminal 2 are described by taking the terminal 2A as an example.

The destination determination portion 201 of the terminal 2A determines an image forming apparatus 1 to be connected to the subject terminal 2A, namely, the other end of the connection, in the following manner.

When no image forming apparatus 1 is connected to the terminal 2A, the destination determination portion 201 determines, from among the image forming apparatuses 1 detected by the near field communication device 20g, the image forming apparatus 1 located closest to the terminal 2A as the other end of the connection. Known methods may be used to detect the image forming apparatus 1 located closest to the terminal 2A.

One of the known methods is as follows. The destination determination portion 201 checks the intensity of radio waves which are sent by each of the image forming apparatuses 1 and received by the near field communication device 20g. The destination determination portion 201 determines that the image forming apparatus 1 located closest to the terminal 2A is the image forming apparatus 1 sending radio waves having the highest intensity. The distance between the terminal 2A and the image forming apparatus 1 may be measured based on the intensity of radio waves.

Another one of the known methods is as follows. The destination determination portion 201 measures the position of the subject terminal 2A with a measurement system such as a Global Positioning System (GPS). Since the image forming apparatuses 1 are placed at predetermined installation sites, it is preferable that the terminal 2A stores the positions of the image forming apparatuses 1 in advance. The destination determination portion 201 calculates a distance between the terminal 2A and each of the image forming apparatuses 1 based both on the measured position of the subject terminal 2A and the positions of the image forming apparatuses 1. The destination determination portion 201 then detects that the image forming apparatus 1 located closest to the terminal 2A is the image forming apparatus 1 having the shortest distance from the terminal 2A.

Suppose that, after the terminal 2A connects to an image forming apparatus 1, the user moves to another place with the terminal 2A. In such a case, the distance between the terminal 2A and the image forming apparatus 1 may increase, and the distance between the terminal 2A and another image forming apparatus 1 may decrease. For example, when the distance between the image forming apparatus 1A and the terminal 2A that has connected to the image forming apparatus 1A is equal to or longer than a predetermined distance, the destination determination portion 201 newly detects an image forming apparatus 1 located closest to the terminal 2A. The destination determination portion 201 then determines that the image forming apparatus 1 located closest to the terminal 2A is a new other end of the connection. Alternatively, when a distance between the terminal 2A and an image forming apparatus 1 other than the image forming apparatus 1A is shorter than the distance between the terminal 2A and the image forming apparatus 1A, the destination determination portion 201 newly detects an image forming apparatus 1 located closest to the terminal 2A. The destination determination portion 201 then determines that the image forming apparatus 1 located closest to the terminal 2A is a new other end of the connection.

Another configuration is also possible in which the destination determination portion 201 displays, in the touch-sensitive panel display 20d, a list of image forming apparatuses 1 with which the terminal 2A can perform communication with Bluetooth, and determines an image forming apparatus 1 selected by the user to be the other end of the connection.

Every time the destination determination portion 201 determines the other end of the connection, the connection processing portion 202 controls the near field communication device 20g to connect the terminal 2A to the image forming apparatus 1 which has been determined to be the other end of the connection. If a connection between the terminal 2A and another image forming apparatus 1 has already been established, the connection therebetween is cancelled (broken) beforehand.

The connection history storing portion 203 stores therein the connection historical data 51 showing a history of connections between the subject terminal 2A and the individual image forming apparatuses 1. If the terminal 2A has connected to the image forming apparatuses 1A, 1B, and 1C in the stated order, and then, currently connects to the image forming apparatus 1C, then the connection historical data 51 indicates a history of the connections as that shown in FIG. 6.

With the image forming apparatus 1, when a connection with the terminal 2 is established with Bluetooth, the connection notifying portion 101 of FIG. 4 sends connection notification data 52 indicative of the terminal 2 to all of the other image forming apparatuses 1. Alternatively, the connection notifying portion 101 may send the connection notification data 52 only to an image forming apparatus 1 determined in advance.

When the connection with the terminal 2 with Bluetooth is cancelled (broken), the disconnection notifying portion 102 sends disconnection notification data 53 to all of the other image forming apparatuses 1.

The connection information managing portion 103 has a connection information table 54 (see FIG. 8). The connection information managing portion 103 updates the connection information table 54 to manage information related to connections between the image forming apparatuses 1 and the terminals 2.

The connection information table 54 has, for each of the image forming apparatuses 1, a record showing the other end of the connection (the currently-connected terminal 2). The connection information table 54 is updated in the following manner.

When receiving the connection notification data 52 from another image forming apparatus 1, the connection information managing portion 103 updates a record of the aforementioned another image forming apparatus 1 to show, as the other end of the connection, a terminal 2 indicated in the connection notification data 52.

When receiving the disconnection notification data 53 from another image forming apparatus 1, the connection information managing portion 103 updates a record of the aforementioned another image forming apparatus 1 to show no devices as the other end of the connection.

When the subject image forming apparatus 1 connects to the terminal 2 through the near field communication device 10i, the connection information managing portion 103 updates a record of the subject image forming apparatus 1 to show the terminal 2 as the other end of the connection. At this time, the connection notifying portion 101 sends connection notification data 52 to all of the other image forming apparatuses 1 as described above.

When the connection with the terminal 2 through the near field communication device 10i is cancelled, the connection information managing portion 103 updates the record of the subject image forming apparatus 1 to show no devices as the other end of connection. At this time, the disconnection notifying portion 102 sends disconnection notification data 53 to all of the other image forming apparatuses 1 as described above.

[Operation on Image Forming Apparatus 1 by Remote Panel Service]

After the connection between the image forming apparatus 1 and the terminal 2 is established, the individual portions of the image forming apparatus 1 and the individual portions of the terminal 2 provide the remote panel service in the following manner. Hereinafter, an example is provided in which the image forming apparatus 1A and the terminal 2A are connected to each other.

With the image forming apparatus 1A, the connection historical data obtaining portion 121 obtains the connection historical data 51 from the terminal 2A, for example, in the following manner.

The connection historical data obtaining portion 121 requests the connection historical data 51 from the terminal 2A.

When the request from the image forming apparatus 1A is received, the connection history notifying portion 204 of the terminal 2A reads out the connection historical data 51 from the connection history storing portion 203 to send the connection historical data 51 to the image forming apparatus 1A.

When the connection historical data obtaining portion 121 obtains the connection historical data 51, the previous screen data obtaining portion 122 requests screen data 55 from another image forming apparatus 1 to which the terminal 2A has been connected immediately before being connected to the image forming apparatus 1A. Such another image forming apparatus 1 is indicated in the connection historical data 51.

The screen data 55 and screen data on each screen (described later) may be described in a markup language.

The screen data 55 is data on a screen which the aforementioned another image forming apparatus 1 has caused the terminal 2A to display. Hereinafter, such a screen is referred to as a "previous screen 61". To be specific, the screen data 55 indicates screen identifying information on the previous screen 61, an object included in the previous screen 61, and an object identifier of the object. Examples of the object are a button, checkbox, tab, pull-down menu, and icon.

The screen identifying information is to identify a screen and is given to each screen. The screen identifying information includes an "MFP_ID" and a "screen ID". For example, if the MFP_ID of the image forming apparatus 1B is "MFP_B", and if the screen ID of a box screen is "G001", then the screen identifying information on the box screen of the image forming apparatus 1B is "MFP_A-G001". Screens having a common role have the same screen ID code as each other in all the image forming apparatuses 1.

The object identifying information is to identify an object and is given to each object. The object identifying information includes an "MFP_ID", a "screen ID", and an "object_ID". If the object_ID of a button corresponding to a box named box_201 of a box screen of the image forming apparatus 1B is "J101", then the object identifying information on the button is "MFP_B-G001-J001".

The terminal 2 may be so configured to, after connecting to the image forming apparatus 1 with Bluetooth, send the connection historical data 51 without waiting for a request to come.

The new screen data generating portion 123 serves to generate screen data 56 on a new screen 62. The new screen 62 has the same role as that of the previous screen 61. Thus, which screen is to be used as the new screen 62 may be determined based on the screen identifying information indicated in the screen data 55. The new screen 62 has a part of the objects of the previous screen 61. In particular, the new screen 62 has an object which is not steady, namely, an object which is laid out appropriately depending on the situation. The steady object and the object not steady are determined in advance for each screen. The specific examples are discussed later.

In response to the screen data 56 generated by the new screen data generating portion 123, the new screen data transmission portion 124 sends the screen data 56 to the terminal 2A.

With the terminal 2A, the screen display processing portion 205 receives the screen data 56 to display the new screen 62 on the touch-sensitive panel display 20d based on the screen data 56.

The user performs operation such as touching the touch-sensitive panel display 20d while viewing the new screen 62, so that his/her desired processing can be designated.

The operation notifying portion 206 sends, to the image forming apparatus 1A, operation content data 57 indicating the details of the operation made by the user.

With the image forming apparatus 1A, when receiving the operation content data 57 from the terminal 2A, the entity determination portion 125 determines an entity which is to execute the target processing based on the operation content data 57. The entity is defined in advance for each screen. The specific examples are discussed later.

The target processing execution control portion 126 executes the target processing when the entity determination portion 125 determines that the entity to execute the target processing based on the operation content data 57 is the subject image forming apparatus 1A.

The target processing execution instructing portion 127 requests another image forming apparatus 1 to execute the target processing when the entity determination portion 125 determines that the entity to execute the target processing based on the operation content data 57 is the aforementioned another image forming apparatus 1A. The target processing execution instructing portion 127 relays the result of the target processing and the like to the terminal 2A if necessary.

The requested processing execution control portion 128 executes the target processing based on a request from another image forming apparatus 1.

A specific example of the processing by the target processing execution control portion 126, the target processing execution instructing portion 127, and the requested processing execution control portion 128 is discussed later.

When another image forming apparatus 1 sends a request for the screen data 55, the previous screen data providing portion 129 sends, to the aforementioned another image forming apparatus 1, as the screen data 55, image data on the screen which has been displayed in the terminal 2A immediately before the receipt of the request.

[Example where Box Function is Used]

Figure 7:
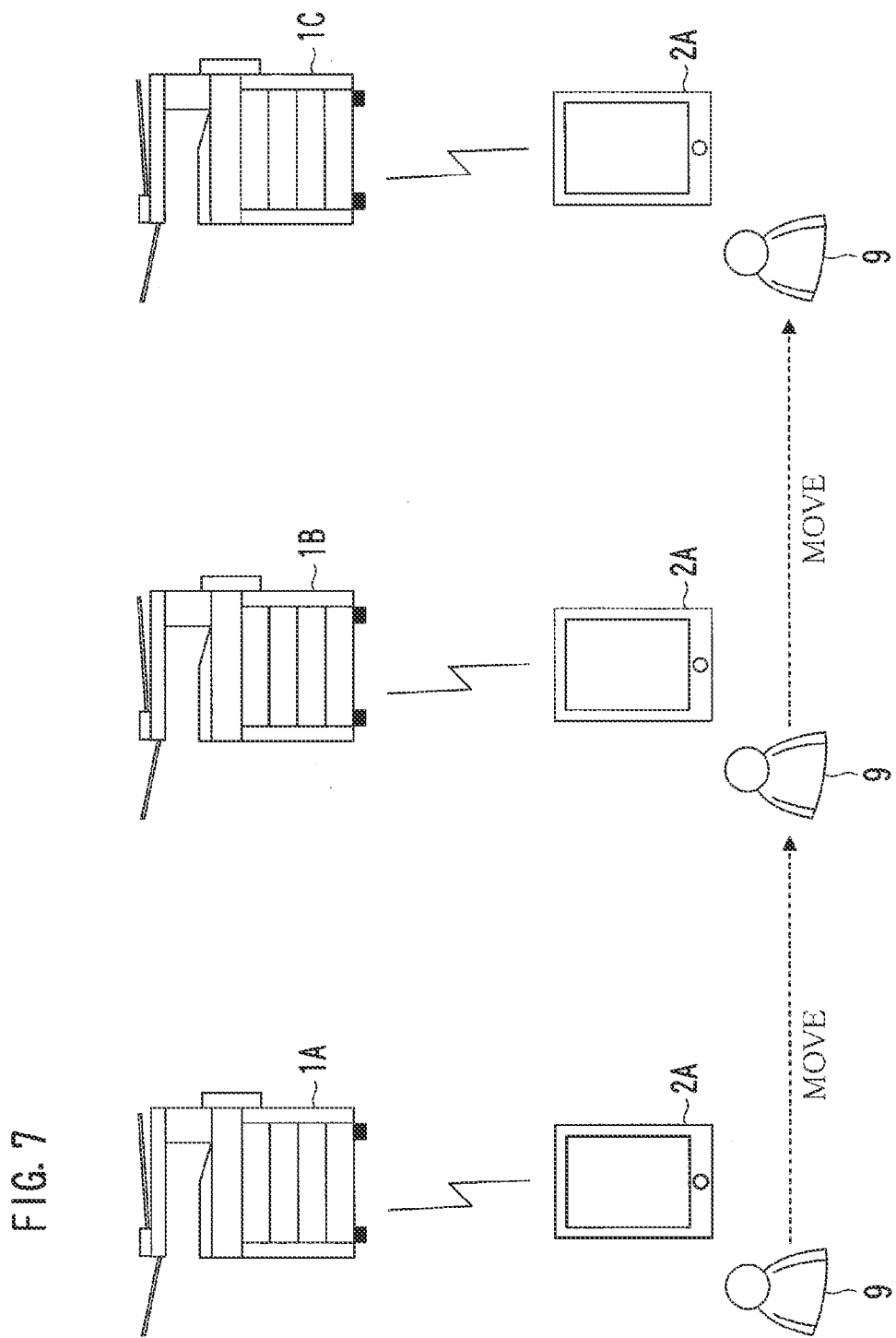
FIG. 7 is a diagram showing an example of transition of user movement and transition of remote access.
Figure 9:
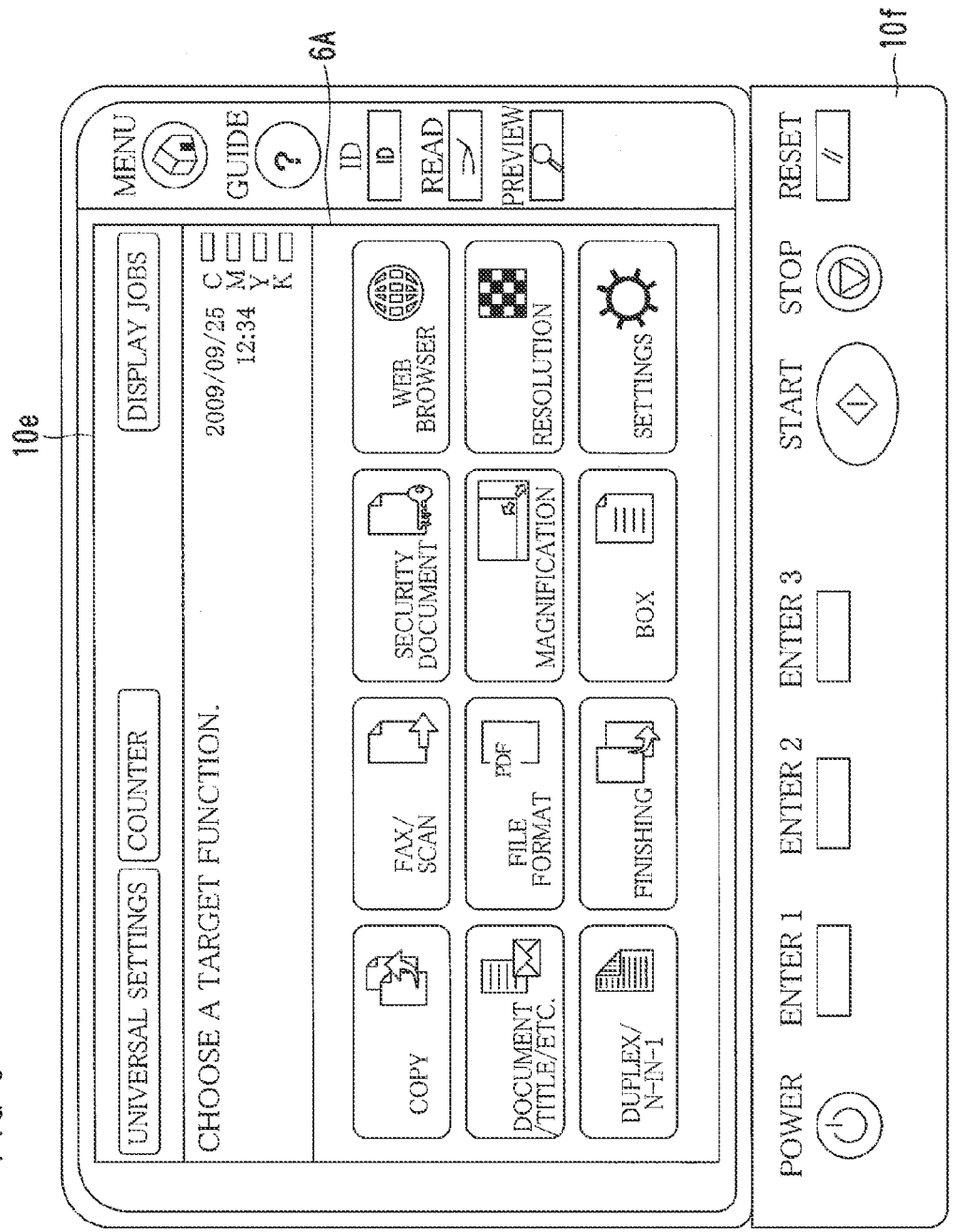
FIG. 9 is a diagram showing an example of a touch-sensitive panel display, an operating key panel, and a start screen.

FIG. 7 is a diagram showing an example of transition of movement of a user 9 and transition of remote access. FIG. 8 is a diagram showing an example of the connection information table 54 and transition thereof. FIG. 9 is a diagram showing an example of the touch-sensitive panel display 10e, the operating key panel 10f, and a start screen 6A. FIGS. 10A-10C are diagrams showing an example of box management screens 6B1, 6B2, and 6B3. FIG. 11 is a diagram showing an example of a file list screen 6C.

The description goes on to an example of processing by the individual devices by taking an example where the user 9 causes the terminal 2A to access to the image forming apparatuses 1A, 1B, and 1C, in the stated order, from a remote location as shown in FIG. 7.

The user 9 moves to close to the image forming apparatus 1A, and turns on the near field communication device 20g of the terminal 2A. Since the connection historical data 51 on the terminal 2A and the connection information table 54 of each of the image forming apparatuses 1 is reset, nothing is indicated therein at this time.

The destination determination portion 201 (see FIG. 5) of the terminal 2A determines that the other end of the connection is the image forming apparatus 1A, and the connection processing portion 202 performs processing for connecting to the image forming apparatus 1A. This enables the user 9 to control the image forming apparatus 1A from a remote location by operating the terminal 2A. The connection history storing portion 203 writes, into the connection historical data 51, the identifier of the image forming apparatus 1A and a time at which the connection to the image forming apparatus 1A is established.

With the image forming apparatus 1A, the connection notifying portion 101 (see FIG. 4) sends, to the other image forming apparatuses 1, data indicative of the terminal 2A as the connection notification data 52. The connection information managing portion 103 writes an identifier of the terminal 2A to a record, of the connection information table 54, corresponding to the image forming apparatus 1A. This updates the connection information table 54 as shown in FIG. 8 from (A) to (B).

Likewise, in each of the image forming apparatuses 1 except the image forming apparatus 1A, the connection information managing portion 103 receives the connection notification data 52, and writes the identifier of the terminal 2A to the record, of the connection information table 54, corresponding to the image forming apparatus 1A.

With the image forming apparatus 1A, the connection historical data obtaining portion 121 obtains the connection historical data 51 from the terminal 2A.

In the meantime, when the user 9 uses any one of the image forming apparatuses 1 by directly operating the touch-sensitive panel display 10e of the subject image forming apparatus 1, the start screen 6A first appears in the touch-sensitive panel display 10e as shown in FIG. 9.

In the case where the user 9 uses the terminal 2A to control the first image forming apparatus 1 (the image forming apparatus 1A, in this example) from a remote location, the image forming apparatus 1A first sends image data on the start screen 6A to the terminal 2A. Whether or not the image forming apparatus 1A is the first (top) image forming apparatus 1 can be determined based on the connection historical data 51.

With the terminal 2A, when receiving the screen data, the screen display processing portion 205 displays the start screen 6A on the touch-sensitive panel display 20d.

The start screen 6A has buttons corresponding to the major functions of the image forming apparatus 1A. The user 9 presses a button corresponding to the box function in the start screen 6A. This designates, as the target processing, processing for displaying a screen for the box function in the terminal 2A.

The operation notifying portion 206 sends, as the operation content data 57, data indicating that the button corresponding to the box function has been pressed to the image forming apparatus 1A.

With the image forming apparatus 1A, when receiving the operation content data 57, the entity determination portion 125 determines an entity which is to execute the target processing based on the operation content data 57. It is determined, in advance, that when a button is pressed in the start screen 6A, a screen for a function corresponding to the button is displayed in the other end of the connection. The entity determination portion 125 determines that the entity which is to execute the target processing is the image forming apparatus 1A.

When it is determined that the entity which is to execute the target processing is the image forming apparatus 1A, the target processing execution control portion 126 so controls the portions that the target processing is executed in accordance with the operation content data 57. In this example, the target processing execution control portion 126 controls, for example, the near field communication device 10i to execute processing of sending image data on screen for the box function to the terminal 2A.

With the terminal 2A, the screen display processing portion 205 displays the box management screen 6B1 as shown in FIG. 10A on the touch-sensitive panel display 20d.

The box management screen 6B1 has buttons for boxes which the user 9 is allowed to use among the boxes provided in the image forming apparatus 1A. The buttons are objects placed appropriately depending on the situation. The box management screen 6B1 also has buttons for switching to another screen, tabs for narrowing down buttons of the box, objects such as icons showing the residual toner. The objects are steady objects in the box management screen 6B1.

The user 9 presses a button corresponding to a box having files that are to be checked. This designates, as the target processing, processing of displaying a list of files in the terminal 2A. The operation notifying portion 206 sends, as the operation content data 57, data which indicates that the button has been pressed to the image forming apparatus 1A.

With the image forming apparatus 1A, the entity determination portion 125 receives the operation content data 57, and determines an entity which is to execute the processing based on the operation content data 57.

If it is determined that the entity which is to execute the processing is the subject image forming apparatus 1A, then the target processing execution control portion 126 so controls the portions that the processing is executed in accordance with the operation content data 57. For example, when a button of "MFP_A BOX_101" is pressed, the target processing execution control portion 126 searches for files saved to a box of "BOX_101" provided in the image forming apparatus 1A. The target processing execution control portion 126 controls the portions in such a manner that the file list screen 6C showing a list of the files found out by the search is displayed in the terminal 2A as shown in FIG. 11. With the terminal 2A, in response to the file list screen 6C closed, the box management screen 6B1 appears again.

The user 9 moves away from the image forming apparatus 1A with the box management screen 6B1 appearing in the terminal 2A, and moves to close to the image forming apparatus 1B.

With the terminal 2A, the connection processing portion 202 performs processing for disconnecting the terminal 2A from the image forming apparatus 1A and connecting the terminal 2A to the image forming apparatus 1B. This enables the user 9 to control the image forming apparatus 1B from a remote location by operating the terminal 2A. The connection history storing portion 203 writes, into the connection historical data 51, the identifier of the image forming apparatus 1B and a time at which the connection to the image forming apparatus 1B is established.

With the image forming apparatus 1A, after the connection to the terminal 2A is cancelled, the disconnection notifying portion 102 sends the disconnection notification data 53 to the other image forming apparatuses 1. The connection information managing portion 103 deletes the identifier of the terminal 2A from the record, of the connection information table 54, corresponding to the image forming apparatus 1A.

In each of the image forming apparatuses 1 except the image forming apparatus 1A, the connection information managing portion 103 receives the disconnection notification data 53, and deletes the identifier of the terminal 2A from the record, of the connection information table 54, corresponding to the image forming apparatus 1A.

With the image forming apparatus 1B, the connection notifying portion 101 sends, as the connection notification data 52, data indicative of the terminal 2A to the other image forming apparatuses 1. The connection information managing portion 103 writes the identifier of the terminal 2A to a record, of the connection information table 54, corresponding to the image forming apparatus 1B. This updates the connection information table 54 as shown in (C) of FIG. 8.

Likewise, in each of the image forming apparatuses 1 except the image forming apparatus 1B, the connection information managing portion 103 receives the connection notification data 52, and writes the identifier of the terminal 2A to the record, of the connection information table 54, corresponding to the image forming apparatus 1B.

With the image forming apparatus 1B, the connection historical data obtaining portion 121 obtains the connection historical data 51 from the terminal 2A. The connection historical data 51 indicates that the terminal 2A has been connected to the image forming apparatus 1A immediately before connecting to the image forming apparatus 1B.

The previous screen data obtaining portion 122 requests, from the image forming apparatus 1A, data on the previous screen 61 (screen which has been displayed in the terminal 2A before the connection with the image forming apparatus 1B is established).

In response to the request, the previous screen data providing portion 129 of the image forming apparatus 1A sends, as the screen data 55, screen data on the box management screen 6B1 to the image forming apparatus 1B.

With the image forming apparatus 1B, the new screen data generating portion 123 generates screen data for displaying the box management screen 6B2.

As shown in FIG. 10B, the box management screen 6B2 has buttons for boxes which the user 9 is allowed to use among the boxes provided in the image forming apparatus 1B. The box management screen 6B2 also has buttons for the boxes provided in the box management screen 6B1 of FIG. 10A. The buttons may be laid out based on the screen data 55 received from the image forming apparatus 1A.

When the new screen data generating portion 123 generates screen data, the new screen data transmission portion 124 sends the same to the terminal 2A as the screen data 56.

Upon the receipt of the screen data 56, the screen display processing portion 205 of the terminal 2A displays, as the new screen 62, the box management screen 6B2 in the touch-sensitive panel display 20d.

When the user 9 presses any one of the buttons for boxes of the box management screen 6B2, the operation notifying portion 206 sends, as the operation content data 57, data showing that the button has been pressed to the image forming apparatus 1B.

With the image forming apparatus 1B, the entity determination portion 125 receives the operation content data 57, and determines an entity which is to execute the target processing based on the operation content data 57. When a button for a box is pressed, the entity determination portion 125 determines that the entity which is to execute the target processing is the subject image forming apparatus 1B.

If it is determined that the entity which is to execute the processing is the subject image forming apparatus 1B, then the target processing execution control portion 126 so controls the portions that the processing is executed in accordance with the operation content data 57.

The processing for the case where the user 9 presses a button corresponding to a box managed by the subject image forming apparatus 1B is discussed above.

On the other hand, if the user 9 presses a button (button for "MFP_A BOX_101", for example) corresponding to a box managed by another image forming apparatus 1, e.g., by the image forming apparatus 1A, then the target processing execution control portion 126 obtains a list of files saved to the box from the image forming apparatus 1A. The target processing execution control portion 126 so controls the portions that the file list screen 6C showing the list appears in the terminal 2A.

The user 9 moves away from the image forming apparatus 1B with the box management screen 6B2 appearing in the terminal 2A, and moves to close to the image forming apparatus 1C.

In response to the movement of the user 9, each of the image forming apparatus 1B and the terminal 2A performs processing for terminating the connection therebetween and the related processing as discussed above. Further, each of the image forming apparatus 1C and the terminal 2A performs processing for establishing the connection therebetween and the related processing as discussed above. This enables the user 9 to control the image forming apparatus 1C from a remote location by operating the terminal 2A. Then, the connection information table 54 of each of the image forming apparatuses 1 is updated as shown in (D) of FIG. 8.

Processing for displaying a screen is also performed as discussed above. The processing causes the box management screen 6B3 as shown in FIG. 10C to appear in the terminal 2A as a screen for the box function. The box management screen 6B3 has buttons for boxes which the user 9 is allowed to use among the boxes provided in the image forming apparatus 1C. The box management screen 6B3 also has buttons for the boxes provided in the box management screen 6B2 of FIG. 10B. Processing to be performed in response to a button pressed is also performed as discussed above.

In the meantime, the file list screen 6C of FIG. 11 shows a list of files saved to the box named "BOX_101" managed by the image forming apparatus 1A as described above. The user selects any one of the files to enter a print command. This designates, as the target processing, processing for printing an image onto paper by using the selected file. The operation notifying portion 206 sends, as the operation content data 57, data indicative of the file and the command to the image forming apparatus 1 currently connected to the terminal 2A.

The entity determination portion 125 of the currently-connected image forming apparatus 1 determines that the entity to execute the target processing is the subject image forming apparatus 1. The target processing execution control portion 126 then executes the target processing. If the currently-connected image forming apparatus 1 is the image forming apparatus 1A, then the file can be obtained from a box managed by the image forming apparatus 1A. On the other hand, if the currently-connected image forming apparatus 1 is not the image forming apparatus 1A, e.g., if it is the image forming apparatus 1B, then the file is obtained from the image forming apparatus 1B.

In the case where, when the user 9 enters a delete command instead of the print command, the target processing is to delete the file. In such a case, the entity determination portion 125 determines that the entity to execute the target processing is the image forming apparatus 1 managing a box where the file is saved.

With the image forming apparatus 1A, therefore, the entity determination portion 125 determines that the entity to execute the target processing is the image forming apparatus 1A. The target processing execution control portion 126 so controls, for example, the large-capacity storage 10*d* of the subject image forming apparatus 1A as to delete the file.

With another image forming apparatus 1 (the image forming apparatus 1B, for example), the entity determination portion 125 determines that the entity to execute the target processing is the image forming apparatus 1A. The target processing execution instructing portion 127 instructs the image forming apparatus 1A to delete the file. With the image forming apparatus 1A, the requested processing execution control portion 128 controls the large-capacity storage 10*d* of the subject image forming apparatus 1A in such a manner that the file is deleted based on instructions from the image forming apparatus 1B.

[Example where Scanning Function is Used]

Figure 12A:
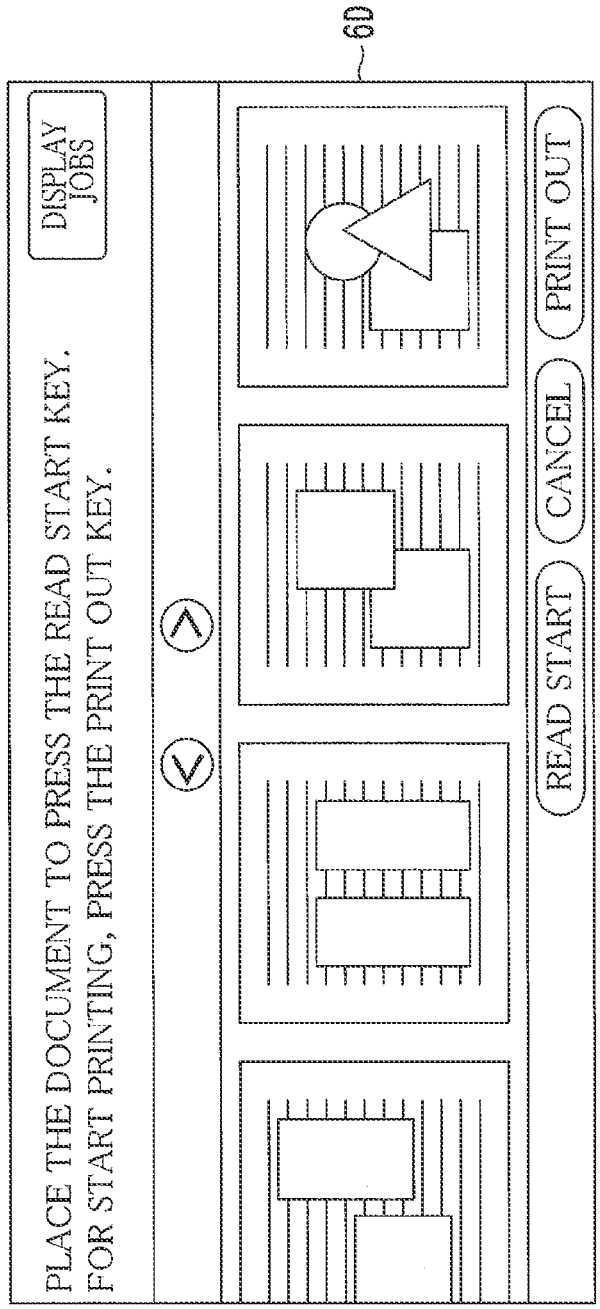

FIGS. 12A and 12B are diagrams showing an example of preview screens 6D and 6D2.

The description goes on to an example of processing by the individual devices by taking an example where the user 9 causes the terminal 2A to remotely access to the image forming apparatuses 1A and 1B in the stated order to use the scanning function. Description of points common to the case where the box function is used shall be omitted.

The user 9 moves to close to the image forming apparatus 1A, and turns on the near field communication device 20*g* of the terminal 2A. In response to the operation, as with the example of using the box function, a connection is established between the image forming apparatus 1A and the terminal 2A, so that processing for updating the connection historical data 51 and the connection information table 54, and another processing are executed.

The user 9 places paper onto the scanner unit 10*j*, and causes the scanner unit 10*j* to optically read the paper. Thereby, image data on an image depicted on the paper is generated.

According to conventional technologies, the image captured by the scanner unit 10*j* was displayed as the preview screen 6D as that shown in FIG. 12A on the touch-sensitive panel display 10*e*. Since the terminal 2A accesses to the image forming apparatus 1A from a remote location, the preview screen 6D appears in the touch-sensitive panel display 20*d* of the terminal 2A not in the touch-sensitive panel display 10*e*.

In general, when images are read out from a predetermined number of paper sheets or more, all the images cannot be laid out simultaneously on the preview screen 6D. In such a case, the preview screen 6D is so displayed that the images to be laid out change, as if pages are turned over, in response to a predetermined button pressed.

After the scanning by the scanner unit 10*j*, the user 9 moves away from the image forming apparatus 1A with the preview screen 6D appearing in the terminal 2A, and moves to close to the image forming apparatus 1B.

In response to the movement of the user 9, a connection is established between the terminal 2A and the image forming apparatus 1B, which enables the user 9 to control the image forming apparatus 1B from a remote location by operating the terminal 2A.

When obtaining the screen data 55 from the image forming apparatus 1A, the image forming apparatus 1B generates a preview screen 6D2 which corresponds to the edited preview screen 6D, and sends, as the screen data 56, screen data on the preview screen 6D2 to the terminal 2A. The terminal 2A displays the preview screen 6D2. The preview screen 6D2 may be displayed in the entirety of the touch-sensitive panel display 10*e*. Alternatively, the preview screen 6D2 may be displayed above the start screen 6A of the image forming apparatus 1B as shown in FIG. 12B.

This enables the user 9 to check a scanned image continuously even after he/she moves away from the image forming apparatus 1A and the connection between the terminal 2A and the image forming apparatus 1A is thereby terminated.

Together with the screen data 55, the image forming apparatus 1B may obtain, from the image forming apparatus 1A, data indicating the last status of the preview screen 6D while the image forming apparatus 1A and the terminal 2 were connected to each other. Based on the data, the preview screen 6D2 may be displayed to indicate the last status in the terminal 2A.

For example, when images of pages 2-4 are laid out in the preview screen 6D at the end, the image forming apparatus 1B displays the preview screen 6D2 in the terminal 2A with the images of pages 2-4 displayed. Alternatively, when an image on the third sheet is enlarged at the end, the image forming apparatus 1B displays the preview screen 6D2 in the terminal 2A with the image of the third sheet enlarged.

When a "print execute" button is pressed on the preview screen 6D2, the image forming apparatus 1B obtains image data on the image from the image forming apparatus 1A to cause the printing unit 10k to print the image onto paper. When operation for rearranging the pages is performed, the image forming apparatus 1B informs the image forming apparatus 1A of the operation content. The image forming apparatus 1A then updates the image data in such a manner that the pages are rearranged accordingly.

Figure 13:
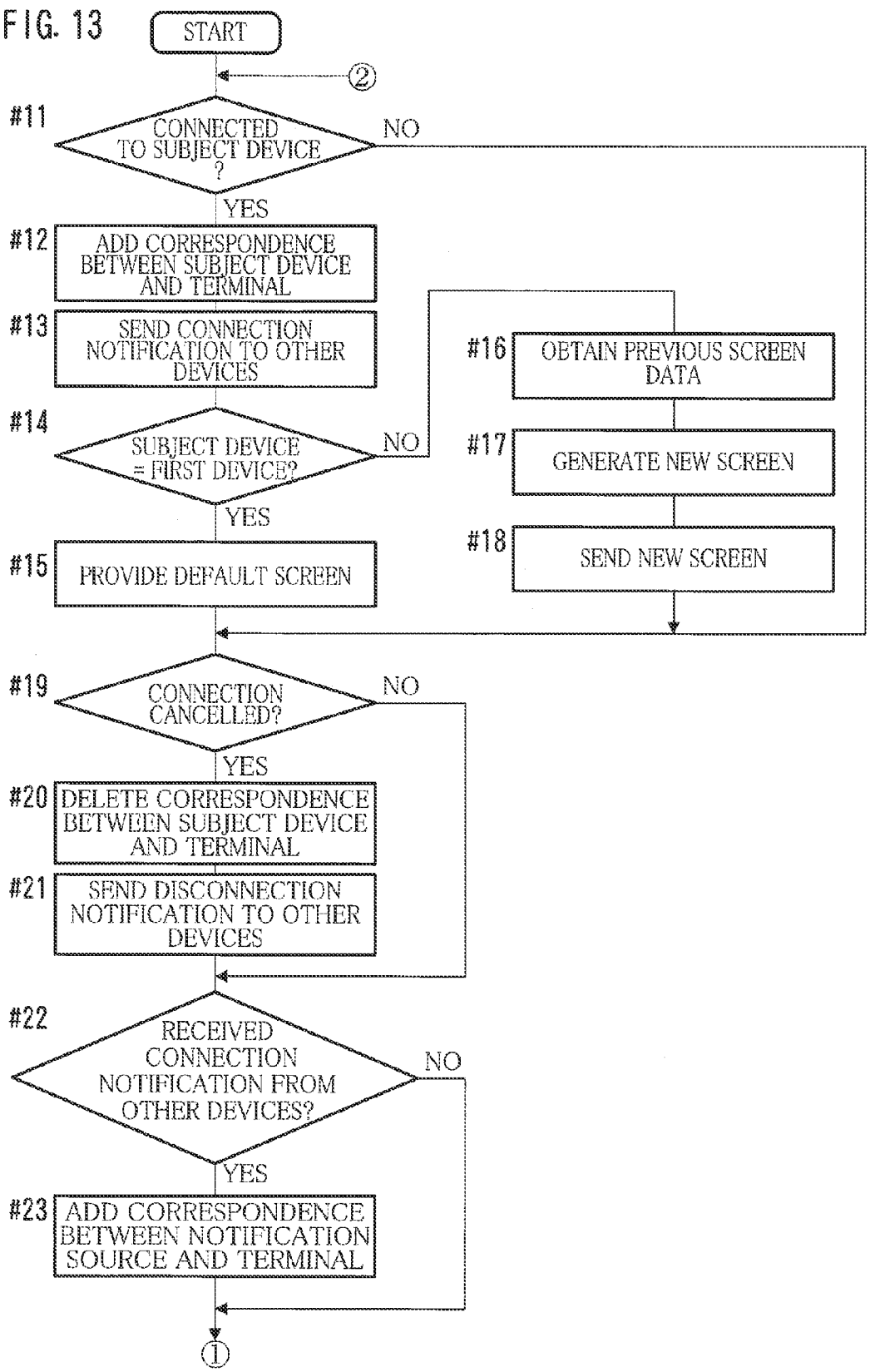
FIG. 13 is a flowchart depicting an example of the flow of the entire processing for a remote panel service.
Figure 14:
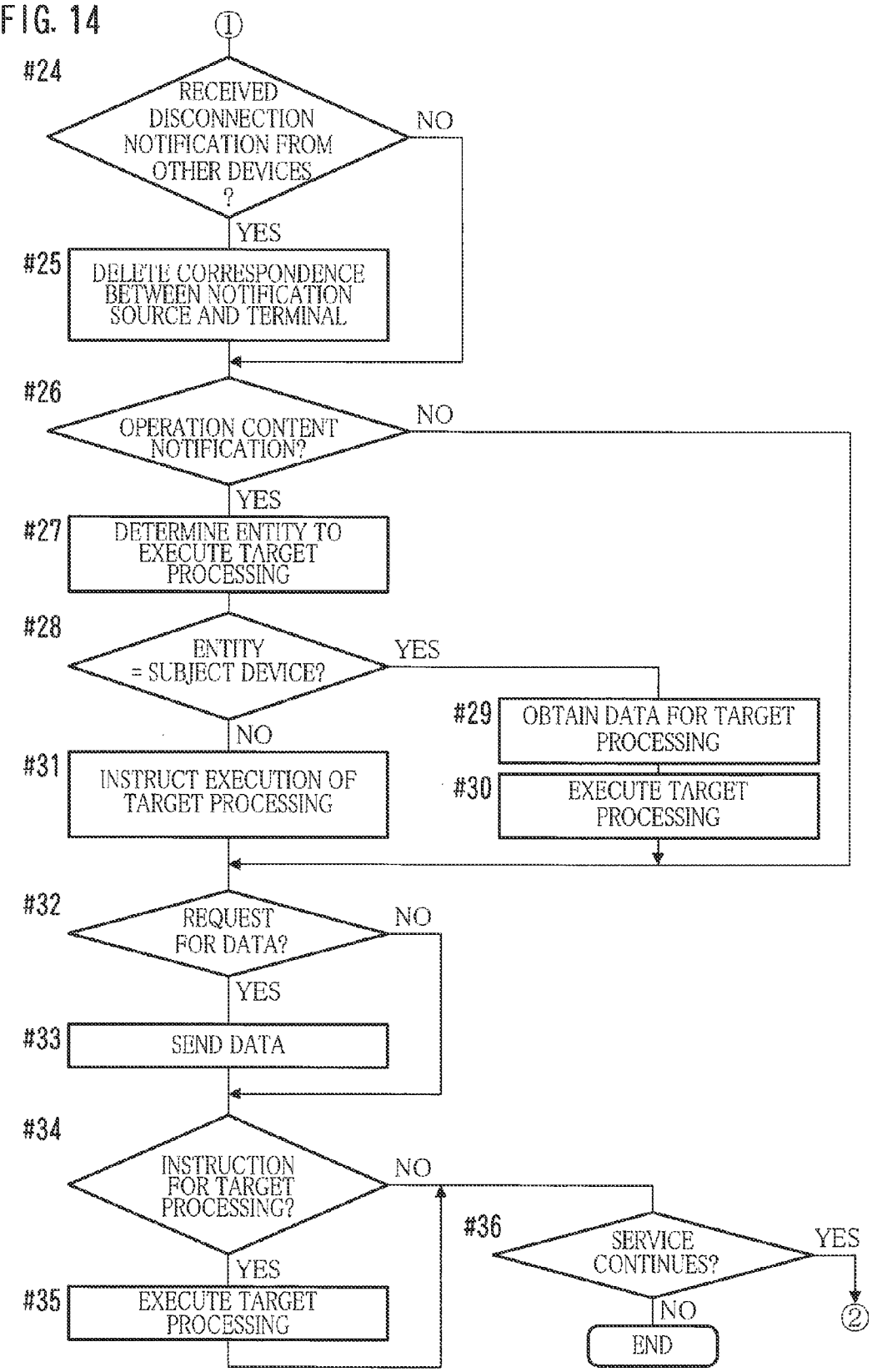
FIG. 14 is a flowchart depicting an example of the flow of the entire processing for a remote panel service.

FIGS. 13 and 14 are flowcharts depicting an example of the flow of the entire processing for the remote panel service.

The description goes on to the flow of the entire processing by the image forming apparatus 1 for a case where the remote panel service is provided with reference to the flowcharts of FIGS. 13 and 14.

While providing the remote panel service, the image forming apparatus 1 performs, in response to the occurrence of an event, processing in accordance with the event. The image forming apparatus 1 performs the processing as shown in FIGS. 13 and 14. Hereinafter, the flow of the entire processing is described by taking an example where the image forming apparatus 1B provides the terminal 2A with the remote panel service.

When a connection with the terminal 2A is established with Bluetooth (YES in Step #11 of FIG. 13), the image forming apparatus 1B updates the connection information table 54 (see FIG. 8) in such a manner that the image forming apparatus 1B and the terminal 2A are associated with each other (Step #12), and sends the connection notification data 52 to the other image forming apparatuses 1 (Step #13).

If the terminal 2A did not connect to another image forming apparatus 1 immediately before the current connection, in other words, if the current connection is the first connection for the terminal 2A (YES in Step #14), then the image forming apparatus 1B causes the terminal 2A to display a default screen, e.g., the start screen 6A (see FIG. 9) (Step #15). On the other hand, if the terminal 2A connected to another image forming apparatus 1 immediately before the current connection (NO in Step #14), then the image forming apparatus 1B obtains, from the aforementioned another image forming apparatus 1, data on a screen (screen data 55) that the aforementioned another image forming apparatus 1 caused the terminal 2A to display (Step #16). The image forming apparatus 1B generates screen data 56 based on the data (Step #17), and sends the screen data 56 to the terminal 2A (Step #18). In this way, the screen as that shown in FIG. 10B or FIG. 10C appears in the terminal 2A.

Alternatively, if the connection with the terminal 2A is cancelled (YES in Step #19), then the image forming apparatus 1B updates the connection information table 54 in such a manner that the association between the image forming apparatus 1B and the terminal 2A is cancelled (Step #20), and sends the disconnection notification data 53 to the other image forming apparatuses 1 (Step #21).

Yet alternatively, if receiving the connection notification data 52 from another image forming apparatus 1 (YES in Step #22), then the image forming apparatus 1B updates the connection information table 54 based on the connection notification data 52 in such a manner that the aforementioned another image forming apparatus 1 and the terminal 2 are associated with each other (Step #23).

Yet alternatively, if receiving the disconnection notification data 53 from another image forming apparatus 1 (YES in Step #24 of FIG. 14), then the image forming apparatus 1B updates the connection information table 54 based on the disconnection notification data 53 in such a manner that the association between the aforementioned another image forming apparatus 1 and the terminal 2 is cancelled (Step #25).

Yet alternatively, if receiving the operation content data 57 from the terminal 2A (YES in Step #26), then the image forming apparatus 1B determines entity to execute the target processing (Step #27).

If determining that the subject image forming apparatus 1B is to execute the target processing (YES in Step #28), then the image forming apparatus 1B obtains data from another image forming apparatus 1 if necessary (Step #29), and executes the target processing based on the operation content data 57 (Step #30). On the other hand, if determining the aforementioned another image forming apparatus 1 is to execute the target processing (NO in Step #28), then the image forming apparatus 1B instructs the aforementioned another image forming apparatus 1 to execute the target processing based on the operation content data 57 (Step #31).

Yet alternatively, if another image forming apparatus 1 receives a request for data (YES in Step #32), then the image forming apparatus 1B sends the requested data to the aforementioned another image forming apparatus 1 (Step #33).

Yet alternatively, if being instructed to execute the target processing by another image forming apparatus 1 (YES in Step #34), then the image forming apparatus 1B executes the target processing (Step #35).

While the remote panel service is provided (YES in Step #36), the image forming apparatus 1B performs the processing from Step #11-Step #35 appropriately.

According to this embodiment, when the other end of the connection of the terminal 2 changes from a first image forming apparatus 1 to a second image forming apparatus 1, a screen which the first image forming apparatus 1 caused the terminal 2 to display is displayed in the terminal 2 by the second image forming apparatus 1. This enables the user to continue operation without any interruption. According to this embodiment, it is possible to operate, in an environment where a plurality of processing apparatuses such as image forming apparatuses 1 is provided, an image forming apparatus 1 from a remote location via the terminal 2 more easily than with conventionally possible.

In this embodiment, when the image forming apparatus 1 establishes a connection with the terminal 2, the image forming apparatus 1 obtains the connection historical data 51 from the terminal 2 to detect another image forming apparatus 1 which connected to the terminal 2 immediately before the current connection. However, another method may be used for the detection. For example, a database may be used to manage a history of connections between devices of the LAN 4, and such a determination may be made based on the database. The database may be provided in each of the image forming apparatuses 1, and be updated in accordance with the connection notification data 52 or the disconnection notification data 53. The database may be implemented by recording a transition of the connection information table 54 in the form of log. Alternatively, the LAN 4 may be configured to include a server, and the server may perform the management processing. Yet alternatively, a screen that was displayed at the end when a connection was established between the terminal 2 and the image forming apparatus 1 may be registered in the database.

In this embodiment, when the image forming apparatus 1 is disconnected from the terminal 2, and then, receives a request for screen data from another image forming apparatus 1, the image forming apparatus 1 responses to the request to send, as the screen data 55, data described in a markup language. However, another configuration is also possible.

For example, the image forming apparatus 1A may send, as the screen data 55 on the box management screen 6B1 (see FIG. 10A), data indicative of names and management sources of boxes shown in the form of button to the image forming apparatus 1B. Alternatively, the image forming apparatus 1A may send, as the screen data 55, image data on each page of the preview screen 6D (image data such as Portable Document Format (PDF) or Tagged Image File Format (TIFF)). In other words, the image forming apparatus 1A sends, among the objects constituting a screen, data on an object laid out appropriately depending on the situation.

The image forming apparatus 1B preferably generates screen data on the box management screen 6B2 or the preview screen 6D2 based on such screen data to send the screen data to the terminal 2 as the screen data 56.

If the other end of the connection changes from, for example, the image forming apparatus 1A to the image forming apparatus 1B while the file list screen 6C (see FIG. 11) appears in the terminal 2, the image forming apparatus 1B preferably causes the terminal 2 to display the file list screen 6C. If a file saved to a box managed by the image forming apparatus 1A is selected in the file list screen 6C, and if a print command is entered, then the image forming apparatus 1B preferably receives the file from the image forming apparatus 1A to carry out printing. Alternatively, if a delete command is entered, then the image forming apparatus 1B preferably instructs the image forming apparatus 1A to delete the file.

The image forming apparatus 1 may distinguish between an object corresponding to a resource of another image forming apparatus 1 and an object corresponding to a resource of the subject image forming apparatus 1. For example, the image forming apparatus 1 and the aforementioned another image forming apparatus 1 may use different colors for the objects. Alternatively, an object corresponding to a resource of the aforementioned another image forming apparatus 1 may be displayed in the form of shortcut button. If the button is pressed, a screen only for the resource of the aforementioned another image forming apparatus 1 may be displayed.

Figure 15B:
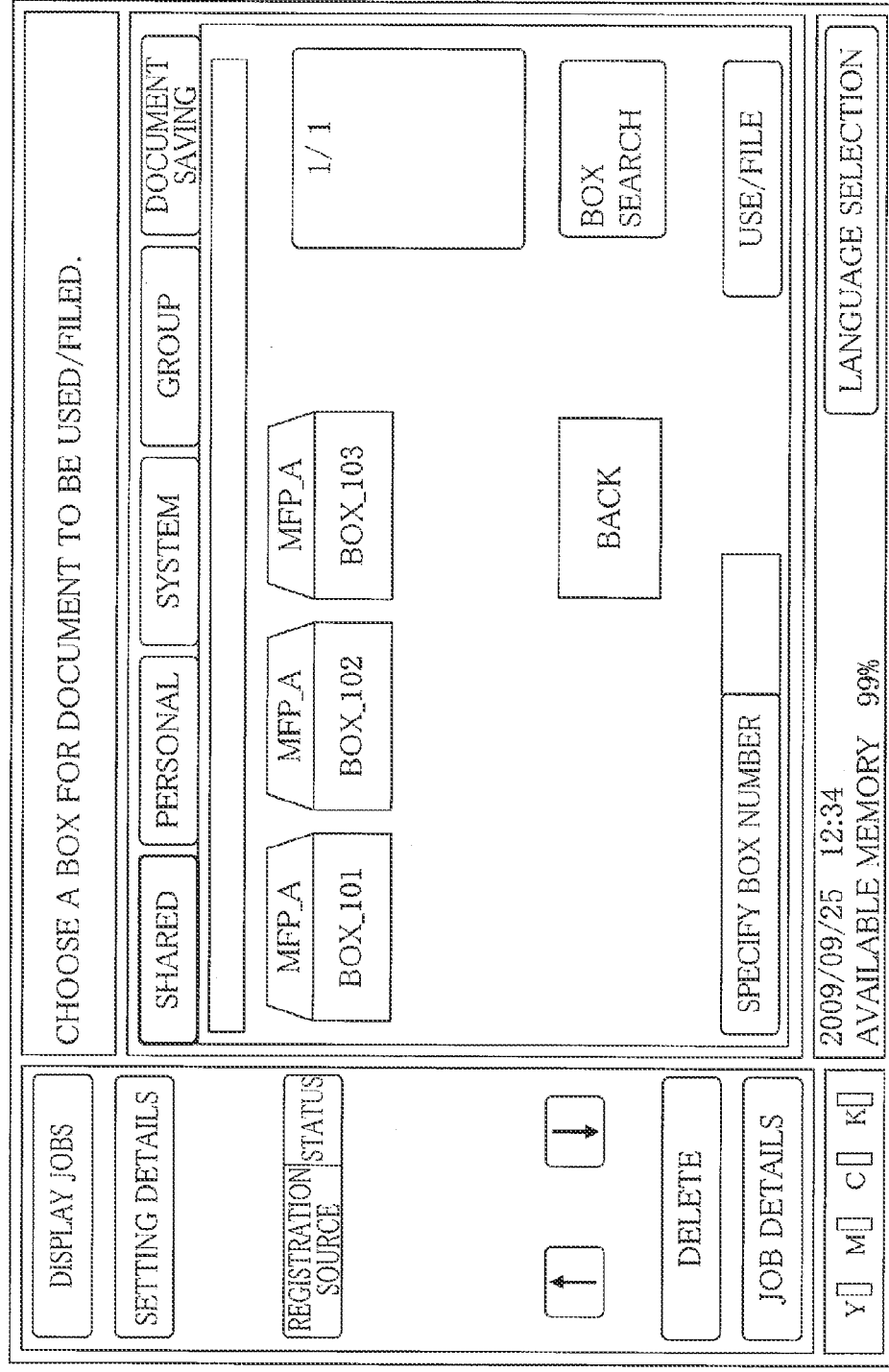

FIGS. 15A and 15B are diagrams showing a modified example of a box management screen. The image forming apparatus 1B causes the terminal 2 to display, for example, a box management screen 6B2' as shown in FIG. 15A. The box management screen 6B2' has buttons for boxes managed by the image forming apparatus 1B and a shortcut button. When the shortcut button is selected, the image forming apparatus 1B causes the terminal 2 to display a box management screen 6B1' shown in FIG. 15B. The box management screen 6B1' has buttons for boxes managed by the image forming apparatus 1A and a button to return to the box management screen 6B2'.

In this embodiment, the image forming apparatus 1 prints an image onto paper based on a file selected by the user, or deletes the file. The image forming apparatus 1 may perform another processing. For example, if the file corresponds to image data on a color image, the image forming apparatus 1 may convert the image data into image data on a monochrome image. Alternatively, the image forming apparatus 1 may transfer the image data to another image forming apparatus 1.

In the foregoing embodiment, the processing target is a file saved to a box. The present invention is also applicable to the case where the processing target is a file saved to a so-called cloud server.

As discussed above, when the other end of the connection of the terminal 2 changes from the image forming apparatus 1A to the image forming apparatus 1B, the image forming apparatus 1A provides the image forming apparatus 1B with the screen data 55 on the previous screen 61. Suppose that, for example, the previous screen 61 has buttons for files saved to the cloud server. In such a case, the image forming apparatus 1A provides, as the screen data 55, data indicative of file names and Uniform Resource Locators (URLs) of the files. The image forming apparatus 1B generates a new screen 62 based on the screen data 55 to cause the terminal 2 to display the new screen 62. When any one of the files is selected, the selected file is downloaded based on the URL indicated in the screen data 55, and processing requested by the user (e.g., printing) is executed.

In the foregoing embodiment, the case is described in which the image forming apparatus 1 and the terminal 2 are connected to each other with Bluetooth. The present invention is also applicable to the case where the image forming apparatus 1 and the terminal 2 are connected to each other via the communication line 3.

It is to be understood that the configurations of the LAN 4, the image forming apparatus 1, the terminal 2, the constituent elements thereof, the content and order of the processing, the configuration of the screens, and the like can be appropriately modified without departing from the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A processing apparatus having a function to perform specific processing based on a request from a terminal, the apparatus comprising:
   a connector connecting the processing apparatus to the terminal; and
   a processor and a memory configured to implement the function of:
   before the processing apparatus connects to the terminal, when another processing apparatus connects to the terminal to work in coordination with each other to perform the specific processing, causing the processing apparatus to display, in the terminal, a second screen including a part or a whole of a first screen so that the processing apparatus and the terminal work in coordination with each other to perform the specific processing successively, the first screen having been displayed in the terminal by said another processing apparatus.

2. The processing apparatus according to claim 1, wherein the processor and memory are configured to
obtain, from said another processing apparatus, screen data indicating an element corresponding to the part or the whole of the first screen; and
arrange the second screen based on the screen data to control the terminal to display the second screen.

3. The processing apparatus according to claim 1, wherein each of the first screen and the second screen is used for a user to perform operation for the specific processing.

4. The processing apparatus according to claim 1, wherein the first screen includes a first choice of resources for said another processing apparatus, and
the processor and the memory are configured to control the terminal to display, as the second screen, a screen having a second choice of resources for the processing apparatus together with the first choice of resources.

5. The processing apparatus according to claim 4, wherein the processor and the memory are configured to:
obtain, when being instructed by the terminal to perform, as the specific processing, processing that involves using a resource for said another processing apparatus, the resource from said another processing apparatus to perform the processing.

6. The processing apparatus according to claim 5, further comprising:
a printer,
the specific processing is to print an image onto paper.

7. The processing apparatus according to claim 1, wherein the processor controls the terminal to display the second screen in such a manner that the part or the whole of the first screen appears in a same state as that displayed in the terminal.

8. The processing apparatus of claim 1:
wherein the second screen displayed on the terminal includes a selectable option for controlling a function of the processing apparatus; and
wherein the part or the whole of the first screen included on the second screen includes a selectable option for controlling a function of the another processing apparatus.

9. A display system comprising:
a terminal; and
a first processing apparatus and a second processing apparatus each of which includes a function to perform specific processing based on a request from the terminal; wherein
the first processing apparatus includes a memory containing instructions that, when executed:
connects the first processing apparatus to the terminal, and
controls the terminal to display a first screen, the first screen being used for a user to perform operation for the specific processing,
the second processing apparatus includes a memory containing instructions that, when executed:
connects the second processing apparatus to the terminal, and
when the first processing apparatus connects to the terminal to work in coordination with each other to perform the specific processing, after the first processing apparatus and the terminal are disconnected from each other and the second processing apparatus connects to the terminal, causes the second processing apparatus to display, in the terminal, a second screen including a part of a whole of the first screen so that the second processing apparatus and the terminal work in coordination with each other to perform the specific processing successively, and
the terminal includes a display displaying the first screen and the second screen.

10. The display system of claim 9:
wherein the second screen displayed on the terminal includes a selectable option for controlling a function of the second processing apparatus; and
wherein the part or the whole of the first screen included on the second screen includes a selectable option for controlling a function of the first processing apparatus.

11. A display method comprising, when a terminal connects to a processing apparatus having a function to perform specific processing based on a request from the terminal, allowing the processing apparatus to, before the processing apparatus connects to the terminal, when another processing apparatus connects to the terminal to work in coordination with each other to perform the specific processing, cause the processing apparatus to display, in the terminal, a second screen including a part or a whole of a first screen so that the processing apparatus and the terminal work in coordination with each other to perform the specific processing successively, the first screen having been displayed in the terminal by said another processing apparatus.

12. The display method of claim 11:
wherein the second screen displayed on the terminal includes a selectable option for controlling a function of the processing apparatus; and
wherein the part or the whole of the first screen included on the second screen includes a selectable option for controlling a function of the another processing apparatus.

13. A non-transitory computer-readable storage medium storing thereon a computer program used in a computer having a function to perform specific processing based on a request from a terminal, the computer program causing the computer to perform processing comprising:
connecting the computer to the terminal; and
before the processing apparatus connects to the terminal, when another processing apparatus connects to the terminal to work in coordination with each other to perform the specific processing, causing the processing apparatus to display, in the terminal, a second screen including a part or a whole of a first screen so that the processing apparatus and the terminal work in coordination with each other to perform the specific processing successively, the first screen having been displayed in the terminal by said another processing apparatus.

14. The non-transitory computer-readable storage medium of claim 13:
wherein the second screen displayed on the terminal includes a selectable option for controlling a function of the computer; and
wherein the part or the whole of the first screen included on the second screen includes a selectable option for controlling a function of the another computer.

* * * * *